(12) United States Patent
Saeda et al.

(10) Patent No.: US 11,394,828 B2
(45) Date of Patent: Jul. 19, 2022

(54) IMAGE PROCESSING SYSTEM

(71) Applicant: SHARP KABUSHIKI KAISHA, Sakai (JP)

(72) Inventors: Masao Saeda, Sakai (JP); Yasuhiro Nakai, Sakai (JP); Kohichi Murakami, Sakai (JP); Yasutomo Hayano, Sakai (JP); Emiko Matsuo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/498,719

(22) Filed: Oct. 11, 2021

(65) Prior Publication Data

US 2022/0124199 A1 Apr. 21, 2022

(30) Foreign Application Priority Data

Oct. 16, 2020 (JP) .............................. JP2020-174379

(51) Int. Cl.
*H04M 3/523* (2006.01)
*H04L 51/02* (2022.01)
*H04M 3/51* (2006.01)
*H04N 1/00* (2006.01)

(52) U.S. Cl.
CPC ............ *H04M 3/523* (2013.01); *H04L 51/02* (2013.01); *H04M 3/5183* (2013.01); *H04N 1/00244* (2013.01); *H04N 1/00281* (2013.01); *H04N 1/00344* (2013.01); *H04N 2201/0094* (2013.01)

(58) Field of Classification Search
CPC ..... H04M 3/523; H04M 3/5183; H04L 51/02; H04N 1/00281; H04N 2201/0094
USPC ............ 379/265.09, 265.05, 265.11, 265.13, 379/266.1, 265.12, 265.01
See application file for complete search history.

(56) References Cited

U.S. PATENT DOCUMENTS

2019/0317709 A1 10/2019 Sugimoto et al.
2021/0314282 A1* 10/2021 Sharma .................. G06F 3/167

FOREIGN PATENT DOCUMENTS

JP 2019-191958 A 10/2019

* cited by examiner

*Primary Examiner* — Thjuan K Addy
(74) *Attorney, Agent, or Firm* — ScienBiziP, P.C.

(57) ABSTRACT

An image processing system includes a server, an image processing device, a mobile terminal, and a call center terminal. When switching from a response by a chatbot to a response by an operator is executed, the server transmits a response history of the chatbot to the call center terminal so that the call center terminal may check the response history of the chatbot. The entire response history of the chatbot is presented to the operator when the amount of information on the response history of the chatbot is equal to or less than a predetermined threshold, and a summary of the response history based on the response history of the chatbot is presented to the operator when the amount of information on the response history of the chatbot is more than the threshold.

6 Claims, 20 Drawing Sheets

IMAGE PROCESSING SYSTEM

BACKGROUND OF THE INVENTION

Field of the Invention

The present invention relates to an image processing system, and more particularly, an image processing system that uses for example a chatbot to support a user.

Description of the Background Art

Japanese Unexamined Patent Publication No. 2019-191958 discloses an example of this kind of background art. A message service system according to the background art includes a user terminal used by a user and a chat service server so that the user operates the user terminal to access the chat service server in the cloud, exchanges messages with a chatbot, and causes the chatbot to perform a service such as print service.

In a user support service using a chatbot as described in a background art, when there is a question that the chatbot is not able to answer or a problem is not solvable, an operator may respond in place of the chatbot. In this case, in order for the operator to appropriately respond to the user's inquiry, it is desirable for the operator to quickly and appropriately recognize the content of the interactions between the user and the chatbot up to that point, i.e., the response history of the chatbot.

Thus, the principal object of the present invention is to provide a novel image processing system.

Another object of the present invention is to provide an image processing system that allows an operator to properly respond to a user's inquiry when the operator responds in place of a chatbot in a user support service.

SUMMARY OF THE INVENTION

A first invention is that an image processing system includes: an information processing device having a chatbot function to receive a question about an image processing device providing a predetermined service to a user and automatically generate an answer; and a call center terminal operated by an operator at a call center. The information processing device includes: a response history generator that, when a predetermined switching operation is received to switch from a response by the chatbot function to a response by the operator, generates a response history of a chatbot including content of the question and content of the answer up to when the switching operation is received; a determiner that determines whether an amount of information on the response history is more than a predetermined threshold; a summary generator that generates a summary of the response history based on the response history when the amount of information on the response history is more than the predetermined threshold; and a transmitter that transmits data on the summary of the response history to the call center terminal. The call center terminal includes: an acquirer that acquires the data on the summary of the response history; and a presenter that presents the summary of the response history to the operator.

A second invention according to the first invention is that the summary generator generates the summary of the response history from the response history by a summarizing process or a text shortening process.

A third invention according to the first invention or the second invention is that the transmitter transmits, to the call center terminal, the data on the response history associated with the data on the summary of the response history.

A fourth invention according to any of the first invention to the third invention is that the information processing device further includes an additional information acquirer that acquires additional information about the image processing device, and the transmitter transmits, to the call center terminal, the data on the summary of the response history associated with data on the additional information.

A fifth invention according to the fourth invention is that a storage is further included, which stores the additional information corresponding to position information on the image processing device, wherein the information processing device further includes a position information acquirer that acquires the position information on the image processing device, and the additional information acquirer acquires the additional information in accordance with the position information on the image processing device.

A sixth invention is that an image processing system includes: an information processing device having an automatic response function to receive a question about an image processing device providing a predetermined service to a user and automatically generate an answer; and a call center terminal operated by an operator at a call center, wherein the information processing device includes: a response history generator that, when a predetermined switching operation is received to switch from a response by the automatic response function to a response by the operator, generates a response history including content of the question and content of the answer up to when the switching operation is received; a determiner that determines whether an amount of information on the response history is more than a predetermined threshold; a summary generator that generates a summary of the response history based on the response history when the amount of information on the response history is more than the predetermined threshold; and a transmitter that transmits data on the summary of the response history to the call center terminal, and the call center terminal includes: an acquirer that acquires the data on the summary of the response history; and a presenter that presents the summary of the response history to the operator.

According to the present invention, when the operator responds in place of the chatbot in the user support service, the operator may appropriately respond to the user's inquiry.

The above-described object of the present invention, other objects, features, and advantages may be more apparent from the following detailed descriptions of embodiments with reference to the drawings.

DESCRIPTION OF THE PREFERRED EMBODIMENTS

First Embodiment

Figure 1:
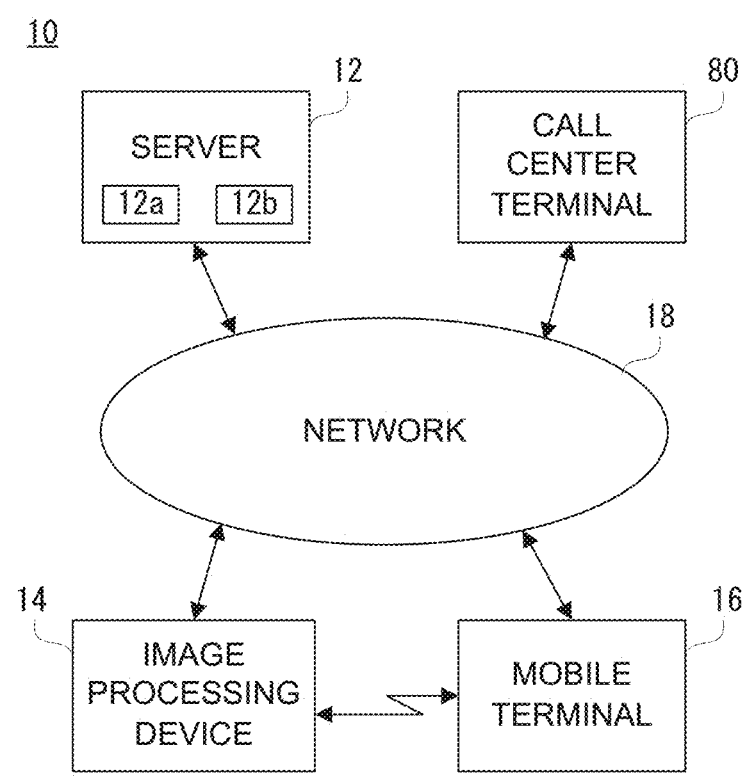
FIG. 1 is a schematic diagram illustrating a configuration of an image processing system according to an embodiment of the present invention.

FIG. 1 is a diagram illustrating an example of a configuration of an image processing system 10 according to the present invention. With reference to FIG. 1, the image processing system 10 according to a first embodiment of the present invention includes a server (information processing device) 12, an image processing device 14, a mobile terminal 16, and a call center terminal 80. The server 12 is communicatively connected to the image processing device 14, the mobile terminal 16, and the call center terminal 80 via a network 18 such as the Internet or a LAN.

The server 12 is a general-purpose server including components such as a CPU 12a, a RAM 12b, and a communication module. The server 12 includes a storage including a non-volatile memory such as HDD, flash memory, or EEPROM or a semiconductor memory such as SSD.

The image processing device 14 is a multifunction peripheral (MFP) having a copier (copy) function, a printer function, a scanner function, a facsimile (fax) function, etc. The image processing device 14 is provided (installed) in a store such as supermarket, restaurant, or convenience store and in a public facility such as station, bus terminal, airport, government office, or library to provide a predetermined service (function) to a user depending on its installation location based on the assumption that it is used by an unspecified number of persons (users).

Figure 2:
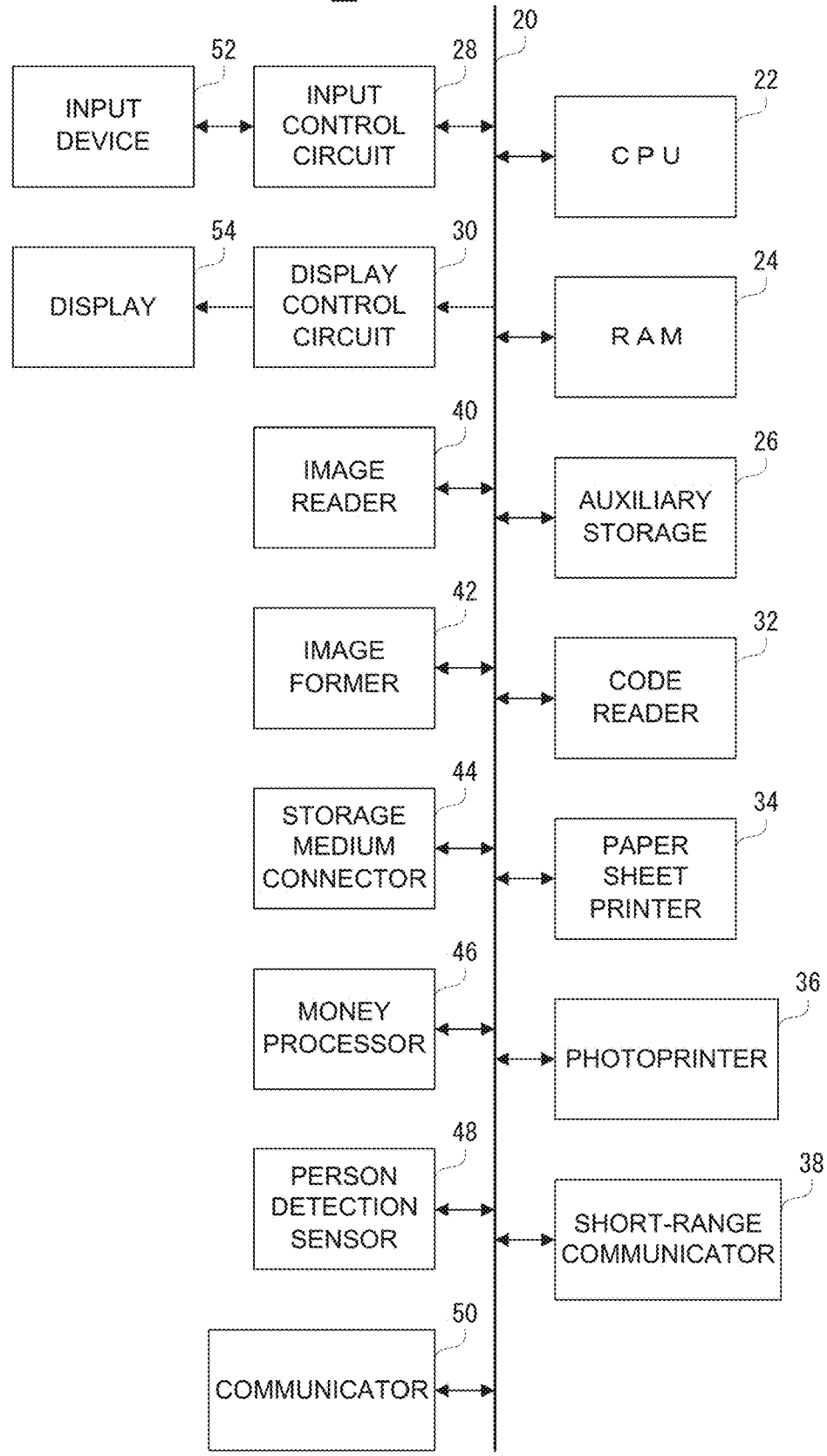
FIG. 2 is a block diagram illustrating an electrical configuration of an image processing device illustrated in FIG. 1.

FIG. 2 is a block diagram illustrating an electrical configuration of the image processing device 14 illustrated in FIG. 1. With reference to FIG. 2, the image processing device 14 includes a CPU 22. The CPU 22 is coupled via a bus 20 to a RAM 24, an auxiliary storage 26, an input control circuit 28, a display control circuit 30, a code reader 32, a paper sheet printer 34, a photoprinter 36, a short-range communicator 38, an image reader 40, an image former 42, a storage medium connector 44, a money processor 46, a person detection sensor 48, and a communicator 50. The input control circuit 28 is coupled to an input device 52, and the display control circuit 30 is coupled to a display 54.

The CPU 22 performs the overall control on the image processing device 14. The RAM 24 is a primary storage of the CPU 22 and is used as a work area and a buffer area.

The auxiliary storage 26 is an auxiliary storage device of the image processing device 14 to store a control program, various types of data, and the like, for controlling an operation of each component in the image processing device 14 by the CPU 22. A memory such as an HDD is used as the auxiliary storage 26. The same applies to an auxiliary storage 66 and an auxiliary storage 86 described below.

The input device 52 is a device that receives a user's input operation (user operation) and includes, for example, a touch panel and a hardware operation button or operation key (hardware key). The touch panel is a general-purpose touch panel and may adopt any type, such as capacitive type, electromagnetic induction type, resistive type, or infrared type. The touch panel may be provided on a display surface of the display 54 or may be provided separately from the display 54. A touch display may be provided in which the touch panel and the display 54 are integrally formed. When the touch panel is provided on the display surface of the display 54, the display 54 presents a graphical user interface (GUI) including a software key such as an icon to receive a user operation via the GUI.

The software key refers to, for example, a key or icon reproduced as software on the display surface of the display. On the other hand, the hardware key refers to a key or push button that is provided as a physical device.

The input control circuit 28 outputs an operation signal or operation data corresponding to an operation of the input device 52 to the CPU 22. For example, the input control circuit 28 applies the necessary voltage, or the like, to the touch panel included in the input device 52, and when a touch operation (touch input) is performed within a touch effective range of the touch panel, outputs the touch coordinate data indicating the position of the touch input to the CPU 22. The input control circuit 28 outputs an operation signal or operation data corresponding to an operation of the operation button or hardware key included in the input device 52 to the CPU 22.

The display control circuit 30 includes a GPU, a VRAM, and the like so that, under an instruction from the CPU 22, the GPU generates, in the VRAM, display image data for displaying various screens on the display 54 using image generation data stored in the RAM 24 and outputs the generated display image data to the display 54. An LCD, EL display, or the like, may be used as the display 54.

The code reader 32 includes, for example, a laser scanner or a camera so as to read a code attached to a product, card, receipt, or the like, or a code (coded image), or the like, displayed on a screen of the mobile terminal 16. Codes readable by the code reader 32 include bar codes (one-dimensional bar codes) or two-dimensional codes (e.g., QR codes (registered trademark), Micro QR codes, DataMatrix, MaxiCode, and VeriCode).

The paper sheet printer 34 is, for example, a thermal printer or a dot impact printer to issue a sheet of paper having an image printed thereon, such as a receipt, acknowledgement, journal, or coupon. Specifically, the paper sheet printer 34 prints various character strings, images, code patterns (such as barcodes), and the like on a roll of paper, and discharges the printed paper sheet.

The photoprinter 36 is, for example, a dye sublimation printer or an inkjet printer to print an image on paper for photo (photo paper). The photo printed by the photoprinter 36 is discharged into a photo discharge part provided on a side surface of the image processing device 14. Image data stored in a storage medium coupled to the storage medium connector 44, image data transmitted from an external computer, or the like, is used as the image data for forming an image on the paper.

The short-range communicator 38 performs, for example, wireless and contactless data communication with a communication target such as an IC card (e.g., identification card, membership card, or employee identification card) or a user terminal in accordance with a communication standard such as ISO/IEC 18092 (what is called Near Field Communication (NFC)). The communicable distance of the short-range communicator 38 is approximately from several centimeters to several meters. For example, the short-range communicator 38 transmits, to the communication target, a signal (read command) for giving an instruction to read data stored in the communication target. In this case, the communication target transmits the desired data to the short-range communicator 38 as a response to the read command. The short-range communicator 38 transmits, to the communication target, a signal (write command) for giving an instruction to write, together with data (write data) to be written. In this case, the communication target writes (stores) the received write data in a storage of the communication target in response to the write command.

The image reader 40 includes a light source, a plurality of mirrors, an imaging lens, a line sensor, etc. The image reader 40 exposes the surface of an original with a light source and guides reflected light, which is reflected by the surface of the original, to the imaging lens with the plurality of mirrors. Then, the reflected light is focused on a light receiving element of the line sensor by the imaging lens. The line sensor detects the luminance and chromaticity of the reflected light focused on the light receiving element and generates the read image data based on the image of the original surface.

The image former (printing device) 42 is a general-purpose laser printer including a photoconductor, a charger, an exposure device, a developing device, a transfer device, a fuser, and the like, to print an image (print image) corresponding to print image data on a recording sheet (paper), etc. The image former 42 may be configured by not only a laser printer but also an inkjet printer.

Although not described in detail, the image former 42 has a color print function and includes an image forming station including a photoconductor, a charger, a developing device, and the like, for each of colors yellow (Y), magenta (M), cyan (C), and black (K).

The storage medium connector 44 includes a mounting part (e.g., a drive and a memory slot) for mounting various storage media. For example, the storage media include optical disks (e.g., CD-R, DVD-R, and BD-R) and flash memory (e.g., USB memory, SD memory card, and memory stick). An optical disk is mounted on the drive, and a flash memory is mounted on the memory slot.

The money processor 46 includes a money input part and a coin return slot. The money input part includes a coin input slot, a bill input slot, a change return lever, etc. The coin input through the coin input slot and the bill input through the bill input slot are classified for each type and stored in a predetermined money storage. The money storage includes a storage for coins and a storage for bills. When a coin or bill is input, the amount of input money is calculated in accordance with the type and number of coins stored in the storage for coins and the type and number of bills stored in the storage for bills. When a predetermined service or the like is performed in the image processing device 14, the cost corresponding to the content of the service is subtracted from the amount of input money, and the remaining amount of the input money is calculated. When the change return lever is operated, a coin or bill is returned in accordance with the remaining amount of the input money. Coins are returned through the coin return slot, and bills are returned through the bill input slot.

The person detection sensor 48 is a sensor that detects whether a person (user) is present in a predetermined area (zone) set in front of the image processing device 14 and is, for example, a distance sensor. For example, an infrared sensor, ultrasonic sensor, or laser distance sensor is used as the distance sensor. The distance sensor outputs distance data to the CPU 22. The CPU 22 determines whether a person is present in the predetermined area in front of the image processing device 14 depending on whether the distance indicated by the distance data output from the person detection sensor 48 falls within a predetermined distance that defines the predetermined area.

The communicator 50 is a communication circuit to connect to the network 18. The communicator 50 includes a wired communication circuit or a wireless communication circuit to communicate with an external computer (external terminal) such as the server 12, the mobile terminal 16, and the call center terminal 80 via the network 18 in accordance with an instruction from the CPU 22 based on a communication method conforming to a known communication standard. The communicator 50 may directly communicate with other external computers such as the mobile terminal 16 wirelessly (e.g., infrared system, WiFi (registered trademark) system, or Bluetooth (registered trademark) system) without involving the network 18.

The electrical configuration of the image processing device 14 illustrated in FIG. 2 is merely an example and is not limited thereto.

The mobile terminal 16 is, for example, a portable (transportable) terminal (mobile terminal) that may be carried around, such as a general-purpose smartphone, future phone, or tablet PC, and has various functions such as a call function, an e-mail function, and a browser function. The mobile terminal 16 is not limited to a terminal possessed by the user, but may also be a terminal provided at an installation location (such as a store) of the image processing device 14.

Figure 3:
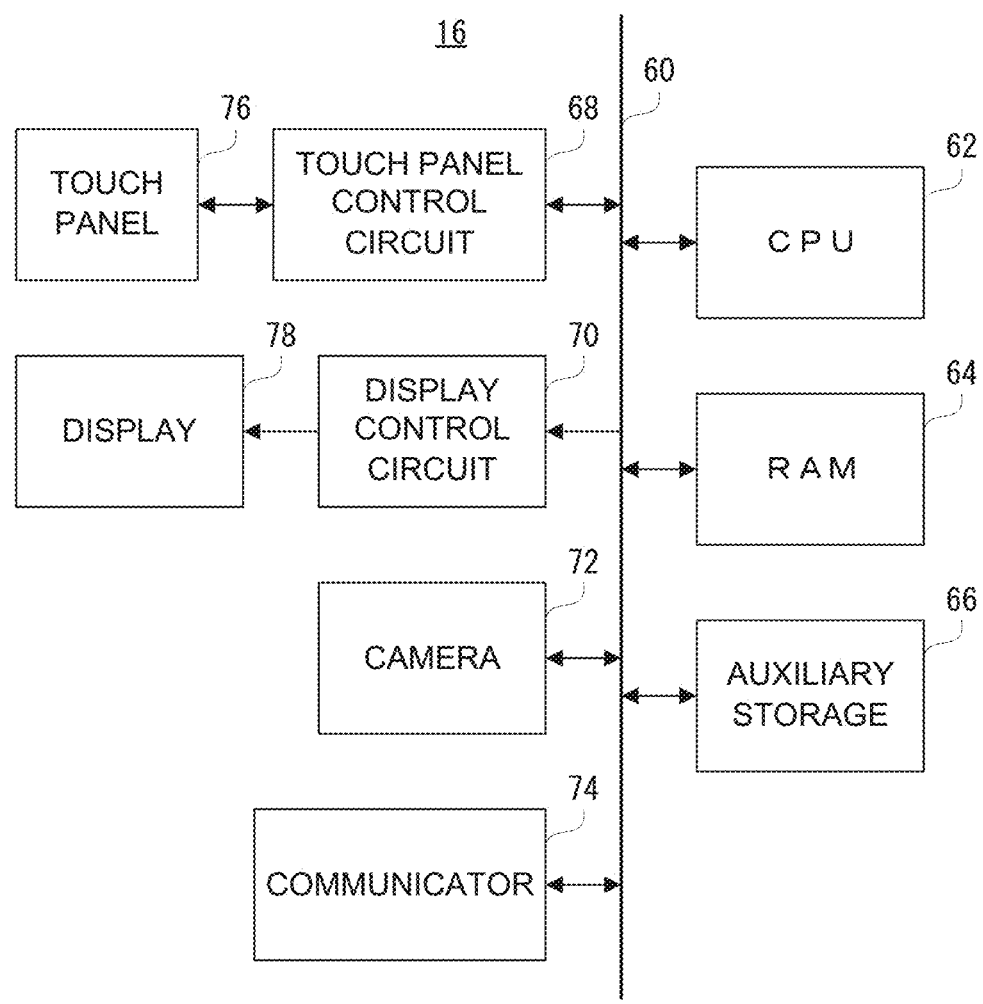
FIG. 3 is a block diagram illustrating an electrical configuration of a mobile terminal illustrated in FIG. 1.

FIG. 3 is a block diagram illustrating an electrical configuration of the mobile terminal 16 illustrated in FIG. 1. With reference to FIG. 3, the mobile terminal 16 includes a CPU 62. The CPU 62 is coupled via a bus 60 to a RAM 64, the auxiliary storage 66, a touch panel control circuit 68, a display control circuit 70, a camera 72, and a communicator 74. The touch panel control circuit 68 is coupled to a touch panel 76, and the display control circuit 70 is coupled to a display 78.

The CPU 62 performs the overall control on the mobile terminal 16. The RAM 64 is used as a work area and a buffer area of the CPU 62. The auxiliary storage 66 is an auxiliary storage device of the mobile terminal 16.

The touch panel control circuit 68 applies the necessary voltage, or the like, to the touch panel 76 and, when a touch input is detected, outputs the touch coordinate data indicating the position of the touch input to the CPU 62.

The display control circuit 70 includes a GPU, a VRAM, and the like so that, under an instruction from the CPU 62, the GPU generates, in the VRAM, display image data for displaying various screens on the display 78 using image generation data stored in the RAM 64 and outputs the generated display image data to the display 78.

The camera 72 includes an imaging device (image sensor) and a focus lens whose position is adjustable to capture an image by converting the captured light as visible light taken from the imaging device into an electrical signal. Examples of the imaging device include a solid-state imaging device such as a charge coupled device (CCD) image sensor or a complementary metal oxide semiconductor (CMOS) image sensor. The RAM 64 stores captured image data output from the camera 72.

The communicator 74 includes a wireless communication circuit to connect to the network 18 and communicates with an external computer such as the server 12, the image processing device 14, and the call center terminal 80 via the network 18 in response to an instruction from the CPU 22. The communicator 74 may also communicate directly with other external computers such as the image processing device 14 wirelessly without involving the network 18. The communicator 74 may also perform a wireless communication with a mobile base station so as to make voice calls with other terminal devices that are capable of telephone communications.

The electrical configuration of the mobile terminal 16 illustrated in FIG. 3 is merely an example and need not be limited thereto. Although not illustrated, the mobile terminal 16 includes an audio inputter/outputter. The audio inputter/outputter includes a speaker and a microphone (mic). The speaker outputs sounds such as ring tones to inform the user of incoming telephone calls and receipt of e-mails and sounds from a telephone apparatus on the other end of the line during a voice call through a telephone communication. The user's voice is input to the microphone during a voice call through a telephone communication. The mobile terminal 16 may include a hardware operation button as another input device.

The call center terminal 80 is a general-purpose computer (terminal) used by an operator at a call center and corresponds to, for example, a desktop PC, a notebook (laptop) PC, and a tablet PC.

Figure 4:
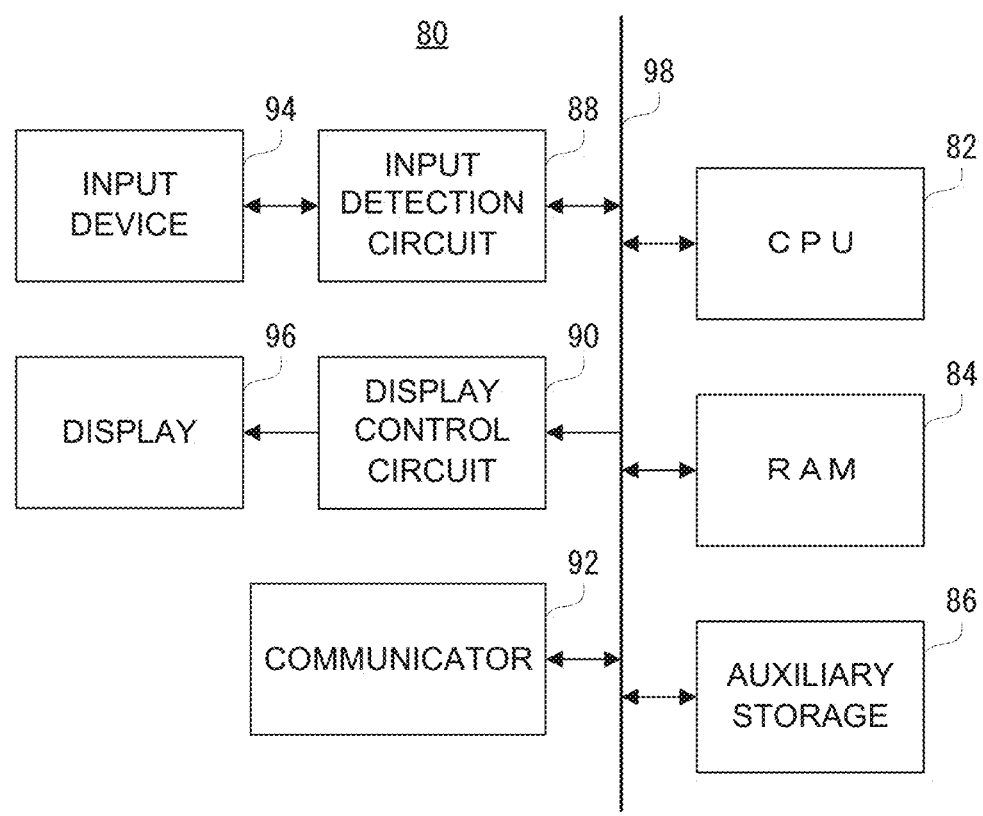
FIG. 4 is a block diagram illustrating an electrical configuration of a call center terminal illustrated in FIG. 1.

FIG. 4 is a block diagram illustrating an electrical configuration of the call center terminal 80 illustrated in FIG. 1. With reference to FIG. 4, the call center terminal 80 includes a CPU 82. The CPU 82 is coupled via a bus 98 to a RAM 84, an auxiliary storage 86, an input detection circuit 88, a display control circuit 90, and a communicator 92. The input detection circuit 88 is coupled to an input device 94, and the display control circuit 90 is coupled to a display 96. The input device 94 is, for example, a keyboard and/or a computer mouse, and when the input device 94 is a keyboard, a hardware operation button or operation key is included. A touch panel may also be used as the input device 94.

The CPU 82 performs the overall control on the call center terminal 80. The RAM 84 is used as a work area and a buffer area of the CPU 82. The auxiliary storage 86 is an auxiliary storage device of the call center terminal 80.

The input detection circuit 88 outputs an operation signal or operation data corresponding to an operation of the input device 94 described above to the CPU 82. The display control circuit 90 includes a GPU, a VRAM, and the like so that, under an instruction from the CPU 82, the GPU generates, in the VRAM, display image data for displaying various screens on the display 96 using image generation data stored in the RAM 84 and outputs the generated display image data to the display 96.

The communicator 92 includes a wired communication circuit or a wireless communication circuit to connect to the network 18 and communicates with an external computer such as the server 12, the image processing device 14, and the mobile terminal 16 via the network in accordance with an instruction from the CPU 82.

The electrical configuration of the call center terminal 80 illustrated in FIG. 4 is merely an example and need not be limited thereto. Although not illustrated, a call center telephone device is provided together with the call center terminal 80. The call center telephone device is a general-purpose telephone device used by the operator at the call center and including, for example, a telephone or headset. The call center telephone device is connected to other telephone devices via the network 18, a public telephone line, etc. The call center telephone device includes a small-sized liquid crystal display, and when the call center telephone device is connected to another telephone device, that is, when there is a call-enabled state between the call center telephone device and another telephone device, the liquid crystal display presents the identification information on the telephone device (the telephone device as the connection destination) connected to the call center telephone device. Thus, the operator at the call center may recognize the identification information on the telephone device as the connection destination.

As described above, the image processing device 14 receives a user operation on the input device 52 via the GUI presented on the display 54. For example, a plurality of operation screens (setting screens) for setting operation conditions of the image processing device 14 is presented to the user, and a service is provided in accordance with the details (operation conditions) set on each operation screen.

Figure 5:
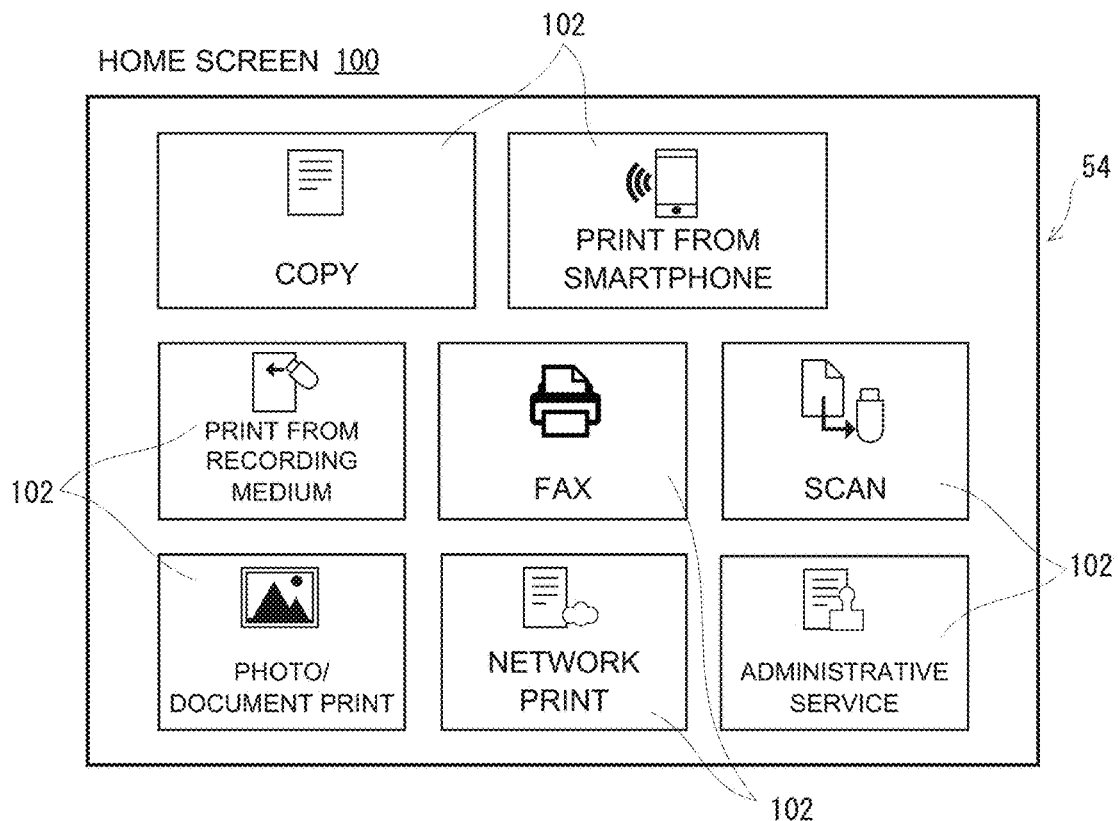
FIG. 5 is a schematic diagram illustrating an example of a home screen.

For example, when the main power of the image processing device 14 is turned on to be in a standby state where each function is executable, the display 54 of the image processing device 14 presents a home screen 100 as illustrated in FIG. 5.

The home screen 100 is an operation screen for selecting a service to be executed. The home screen 100 displays a plurality of selection icons 102 functioning as software keys to select a service.

Each of the selection icons 102 is assigned to a service that may be provided by the image processing device 14, such as "copy", "print from smartphone", "print from recording medium", "fax", "scan", "photo/document print", "network print", "administrative service", etc.

The "print from smartphone" service refers to a print service using image data stored in a mobile terminal such as a smartphone, the "print from recording medium" service refers to a print service using image data stored in a storage medium, and the "network print" service refers to a print service using image data transmitted from an external computer (a server for a network print service). Furthermore, "administrative service" refers to a print service for printing an administrative certificate. The copy service includes a service (normal copy service) for copying (duplicating) an image of an original such as a document on regular paper, a service (photo copy service) for copying a photo image on photo paper, etc.

When the selection icon 102 is operated on the home screen 100, that is, when a service to be executed is selected, the display 54 sequentially presents a plurality of operation screens for setting operation conditions of the selected service. A case where a copy service is selected is described below as an example.

Figure 6:
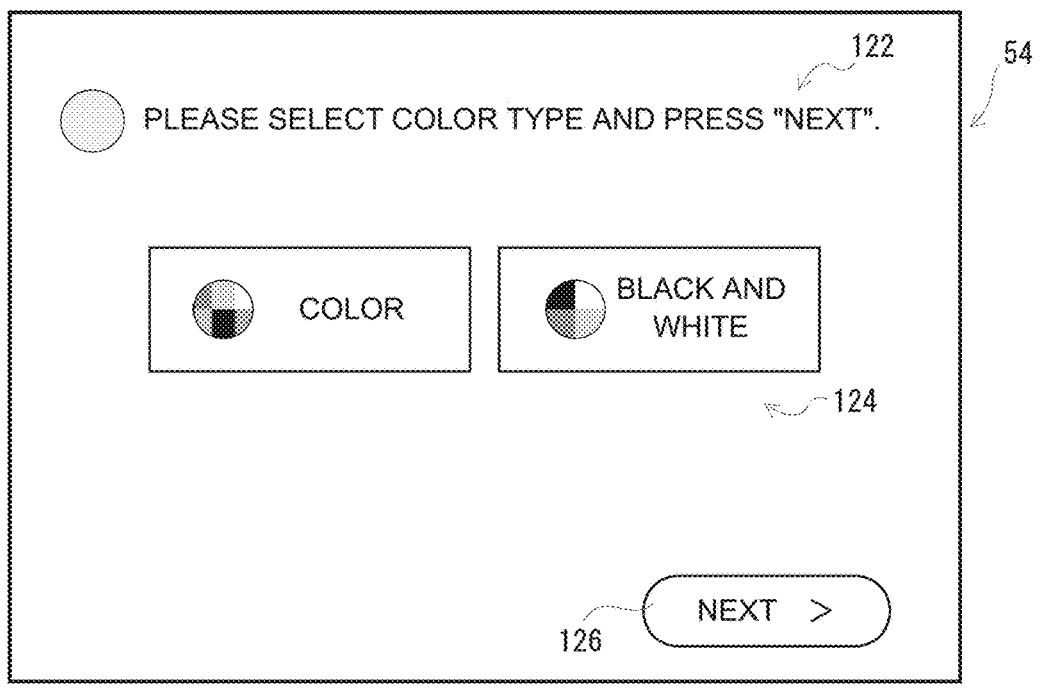
FIG. 6 is a schematic diagram illustrating an example of a first setting screen.

When the selection icon 102 assigned to the copy service is operated (the copy service is selected) on the home screen 100, the display 54 sequentially presents a plurality of operation screens (copy setting screens) for setting the operation conditions (copy conditions) of the copy service. A first setting screen 120 illustrated in FIG. 6 is an example of the copy setting screen and is one screen (e.g., a first screen displayed) among a plurality of operation screens for setting the operation conditions of the copy service.

The first setting screen 120 is a screen for setting a color mode (color condition) in the copy service and includes a notification text 122, a setting part 124, and a transition icon 126.

The notification text 122 is a message, such as "Please select color type and press 'Next'", prompting the user to set (select) the color condition in the copy service and to transition to the subsequent screen when the color condition has been set.

The setting part 124 is provided to set the color condition (color/black and white) in the copy service and includes a plurality of setting icons that are assigned to different color conditions (color/black and white). When any of these setting icons is operated, the color condition for the copy service is set.

The transition icon 126 is an operation icon for proceeding to the subsequent operation screen (screen transition). When the transition icon 126 is operated, the display 54 presents the subsequent operation screen of the previously presented operation screen.

For example, on the first setting screen 120, when the transition icon 126 is operated, the display 54 sequentially presents various operation screens for setting operation conditions (paper size, ratio, number of copies, etc.) of the copy service other than the color condition. When the operation conditions of the copy service assigned to the respective operation screens are set, the settings of the operation conditions of the copy service are completed, and then a start key provided as a software key or a hardware key is pressed, the copy service is executed in accordance with the operation conditions set on the respective setting screens.

Although the case where the copy service is selected is described above as an example, various operation screens for setting operation conditions are sequentially displayed in the same manner when a service other than the copy service is selected.

Here, a user unfamiliar with the image processing device 14 sometimes does not know service content or an operation method of the image processing device 14. A service for supporting such a user includes a user support service (chatbot service) using a chatbot function. A chat refers to a real-time communication by text exchange, and a chatbot service is a service in which, by using a technique such as artificial intelligence, a chatbot automatically responds to user's inquiry content (question). Such a chatbot function is sometimes called an automatic conversation function, automatic answer function, or automatic response function.

Figure 7:
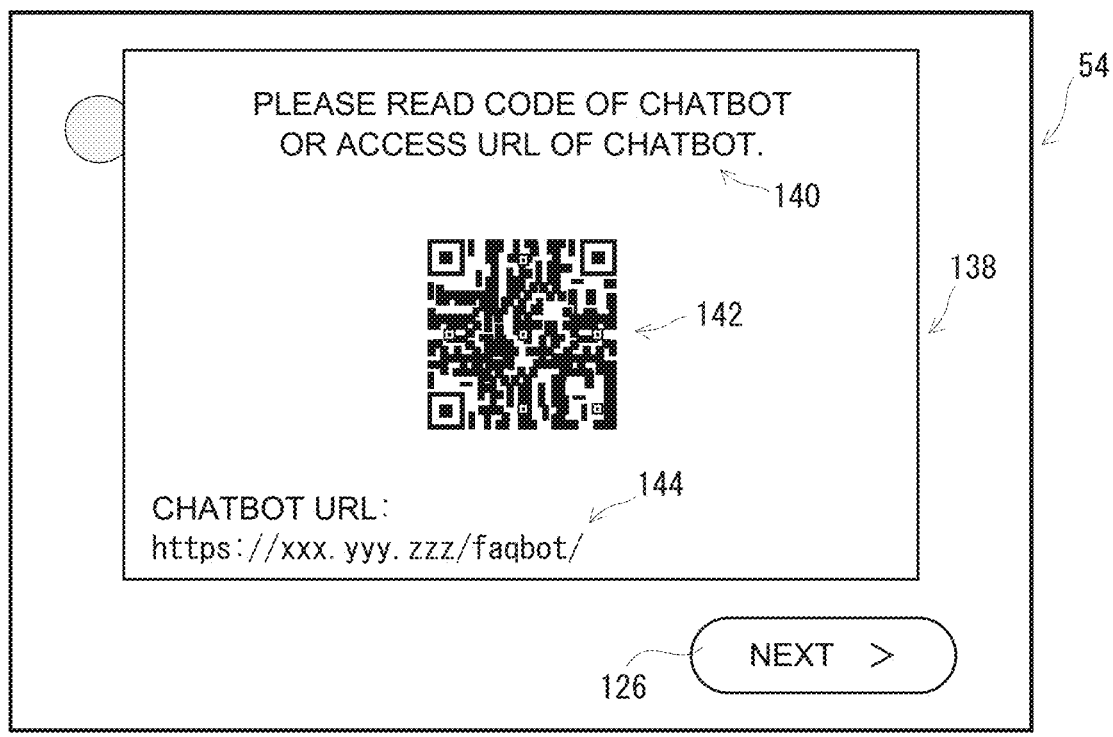
FIG. 7 is a schematic diagram illustrating an example of an operation screen including a connection window.

In the image processing system 10 according to the present embodiment, when a predetermined operation (hereinafter may be referred to as "activation operation") is performed to start (activate) the chatbot service or when an activation condition for the chatbot service is satisfied, the display 54 presents a connection window 138 for activating the chatbot service as illustrated in FIG. 7. The connection window 138 is displayed in a center portion of a display area of the display 54 such that it is superimposed on the front of the operation screen previously presented on the display 54. That is, the connection window 138 is displayed as a pop-up. FIG. 7 illustrates a case where the connection window 138 is displayed on the front of the first setting screen 120.

The activation operation corresponds to a predetermined touch operation on a portion other than the operation icon (e.g., the setting part 124 and the transition icon 126) provided on each operation screen. The touch operation as the activation operation includes long tap (long press) for a predetermined time or longer, slide (drag), flick, double touch, pinch in, pinch out, etc. An activation condition for the chatbot service corresponds to that, for example, the user remains within a predetermined range around the image processing device 14 and the non-operating state of any portions of the image processing device 14 has continued for a predetermined time period. It is determined whether the user remains within the predetermined range around the image processing device 14 in accordance with the output (distance data) of the person detection sensor 48.

The connection window 138 displays (includes) a notification text 140, a coded image 142, and connection destination information 144. The connection window 138 is hidden when a predetermined time period (e.g., 180 to 300 seconds) has elapsed after the time when it is displayed.

The notification text 140 is a message such as "Please read code of chatbot or access URL of chatbot.", promoting reading of the coded image 142 by the mobile terminal 16 or access to the connection destination indicated by the connection destination information 144. The connection destination information 144 includes, for example, a character string indicating a uniform resource locator (URL) of the server 12 that has the chatbot function (provides the chatbot service).

The coded image 142 is, for example, a barcode or a two-dimensional code. The activation data is embedded in the coded image 142. The activation data includes connection data to access a server (the server 12 according to the present embodiment) that provides the chatbot service, data (image processing device identification data) of the identification information on the image processing device 14, and the like. The connection data corresponds to, for example, data of the URL of the server 12. The image processing device identification data corresponds to information for identifying the image processing device 14 by other devices or terminals, such as data of the ID of the image processing device 14 or data of information on the installation location of the image processing device 14.

A predetermined application for reading the coded image 142 is activated in the mobile terminal 16 while the display 54 presents the connection window 138, and after the camera 72 captures the coded image 142, the mobile terminal 16 extracts the coded image 142 from the captured image and decodes the extracted coded image 142.

After decoding the coded image 142, the mobile terminal 16 acquires the activation data embedded in the coded image 142 and starts the access to the server 12, which provides the chatbot service, in accordance with the activation data. In other words, the communication between the mobile terminal 16 and the server 12 is started.

Figure 8:
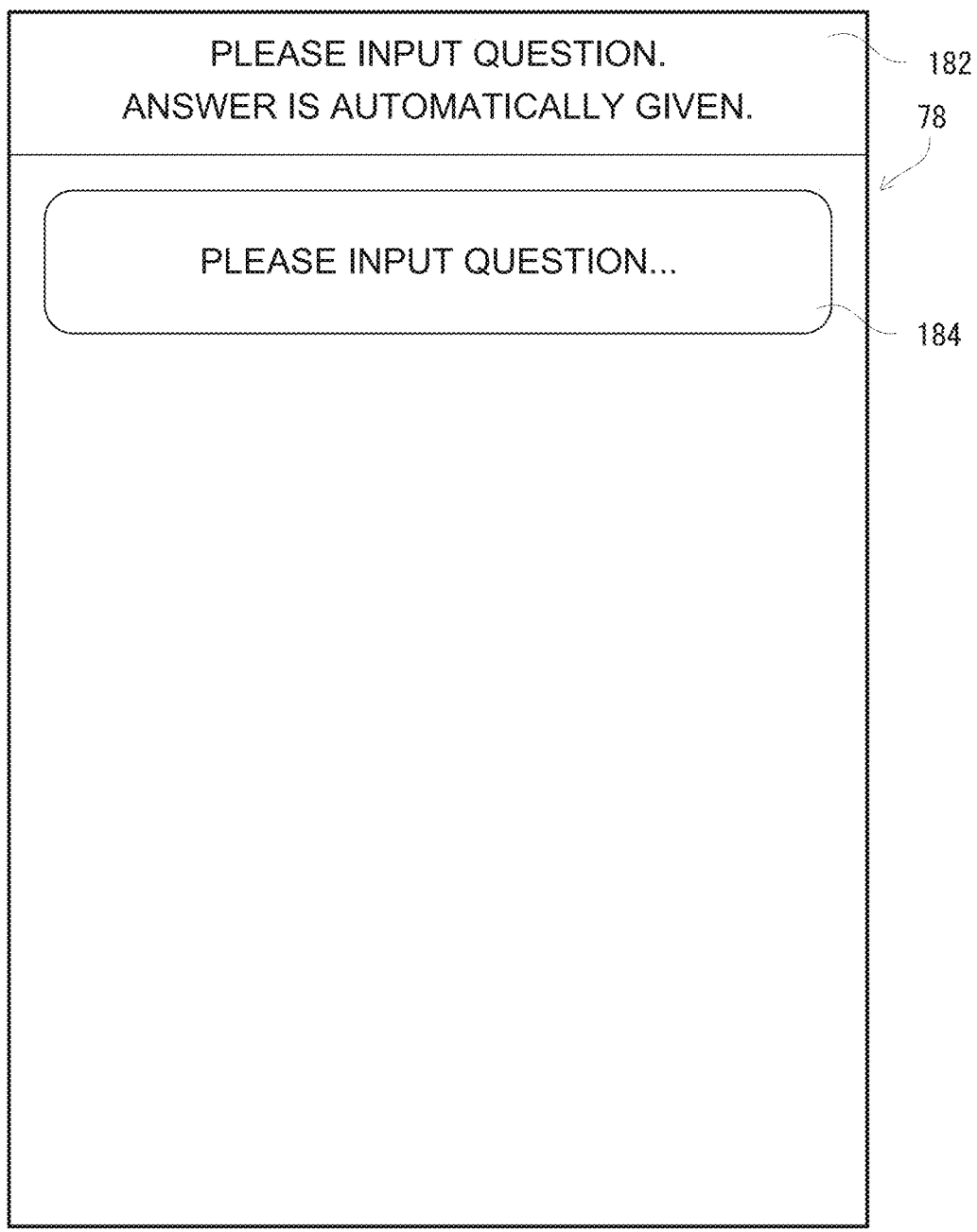
FIG. 8 is a schematic diagram illustrating an example of a chat screen.

When the communication between the mobile terminal 16 and the server 12 is started, the mobile terminal 16 accesses a storage of the server 12 to acquire data (operation screen data) on an operation screen of the chatbot service. When the mobile terminal 16 acquires the operation screen data of the chatbot service, the display 78 of the mobile terminal 16 presents an operation screen (chat screen) 180 of the chatbot service, as illustrated in FIG. 8.

The chat screen 180 is a screen for exchanging texts with a chatbot and includes a notification text 182 and a question input field (character input field) 184.

The notification text 182 is a message, such as "Please input question. Answer is automatically given.", prompting the user to input a question and notifying the user that the question will be answered automatically. The question input field 184 is an input box (text box) for the user to input the content of a question (question text). The question is confirmed when a predetermined operation (such as an operation of an enter key included in a character input application) is received while the content of the question has been input in the question input field 184.

Figure 9:
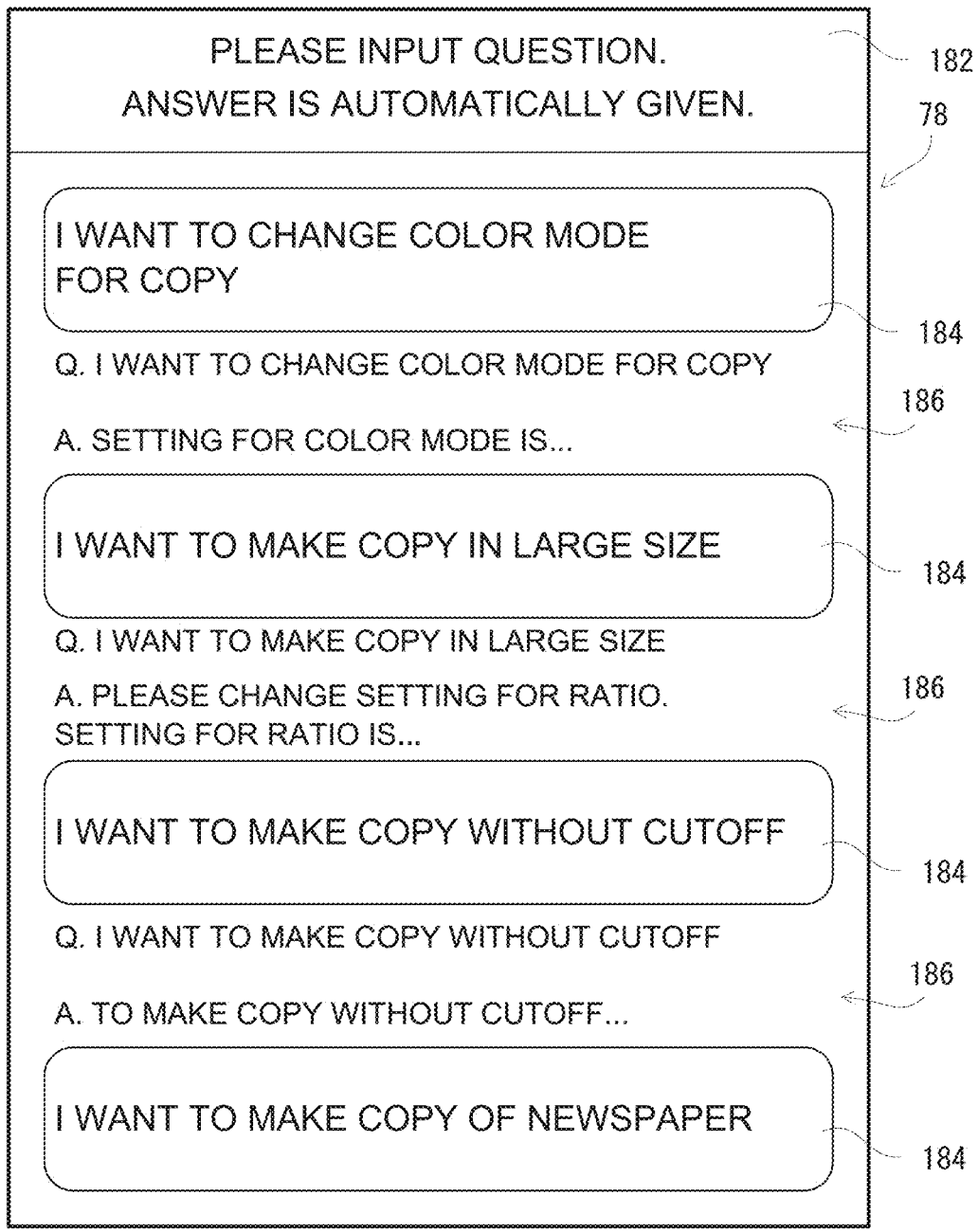
FIG. 9 is a schematic diagram illustrating an example of the chat screen after a question is input.

After the question is input in the question input field 184 and the question is confirmed, the data (question data) on the question is transmitted from the mobile terminal 16 to the server 12, and an answer (answer text) to the question is generated by the server 12. When the answer to the question is generated, the data (answer data) on the answer is transmitted (returned) from the server 12 to the mobile terminal 16 that is the question source. As illustrated in FIG. 9, the mobile terminal 16 displays an answer text 186 based on the answer data after receiving the answer data. When multiple questions are asked, the switching selection window 187 is displayed for each of the questions.

The description in Japanese Unexamined Patent Application Publication No. 2019-128914 by the present applicant may be referred to with regard to a method for automatically answering an input question by a chatbot. To explain briefly, first, possible question texts (registered texts) and answer texts to the respective registered texts are previously registered (stored) in a database. Then, a topic word, which is a subject or object of the question text, and a predicate corresponding to the topic word are extracted from the question text input by the user, and when the topic word is contained in the question text, a registered text associated with the user's question text is searched for by using, as search words, the topic word, the predicate, and an associated word of the topic word and the predicate so that the answer text for the registered text most highly associated with the search word is selected as an answer text for the user's question text.

Figure 10:
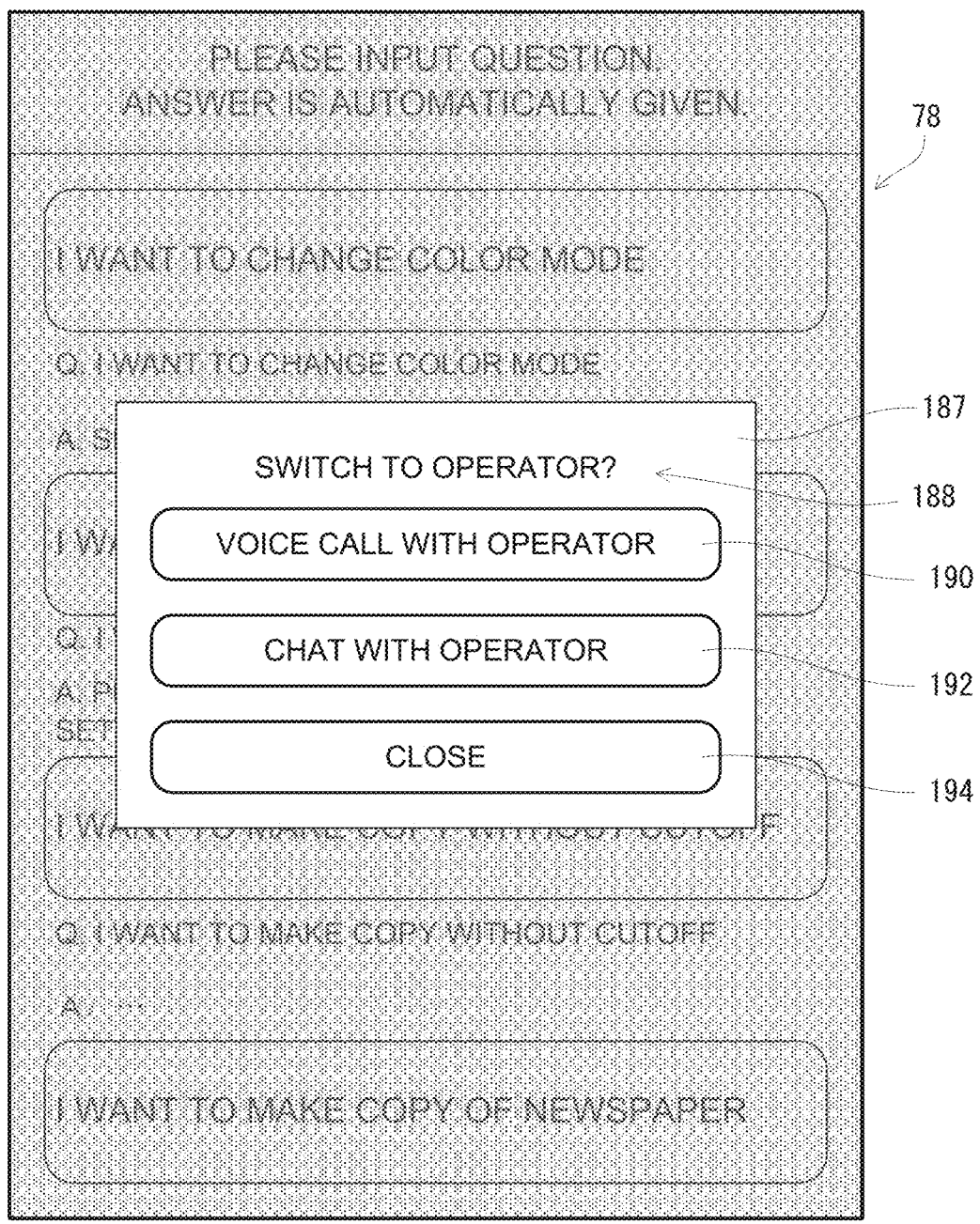
FIG. 10 is a schematic diagram illustrating an example of the chat screen including a switching selection window.

In such a chatbot service, when there is a question that the chatbot is not able to answer or a problem is not solvable, an operator at a call center may respond in place of the chatbot. For example, when a predetermined condition (switching condition) for switching to an operator response is satisfied, the display 78 presents a switching selection window (switching selection screen) 187 for switching to the operator response, as illustrated in FIG. 10.

The switching condition corresponds to that, for example, the user remains within a predetermined range around the image processing device 14 and the non-operating state of any portions of the image processing device 14 has continued for a predetermined time period. The chat screen 180 may include an operation icon for switching to the operator response (for displaying the switching selection window 187), and an operation on the operation icon may be a switching condition.

The switching selection window 187 displays (includes) a notification text 188, a first selection icon 190, a second selection icon 192, and a close icon 194.

The notification text 188 is a message, such as "Switch to operator?", promoting a selection as to whether the chatbot response is to be switched to the operator response.

The first selection icon 190 is an operation icon for making a voice call with the operator. Although not illustrated, when the first selection icon 190 is operated, a call function is enabled and a connection is automatically established with a call center telephone device so as to make a call between the user and the operator at the call center. When a connection is established between the mobile terminal 16 and the call center telephone device, a liquid crystal display of the call center telephone device presents the identification information on the mobile terminal 16. The identification information on the mobile terminal 16 is, for example, a telephone number in the case of a voice call using a telephone line, the name of the terminal in the case of a voice call using the network 18, or the ID of the user in a calling application. Thus, the operator at the call center may identify the mobile terminal 16 connected to the call center telephone device.

The second selection icon 192 is an operation icon for chatting with the operator. Although not illustrated, when the second selection icon 192 is operated, the display 54 presents a screen for chatting with the operator (for person-to-person chatting) instead of the previously displayed chat screen 180. Thus, the user may interact with the operator by exchanging texts. When the second selection icon 192 is operated, the identification information on the mobile terminal 16 is transmitted to the call center terminal 80.

The close icon 194 is an operation icon for closing the switching selection window 187 (not switching to the operator response). When the close icon 194 is operated, the switching selection window 187 is closed (hidden) and the operation screen, which is displayed before the switching selection window 187 is displayed, is returned.

While the switching selection window 187 is displayed, an area other than the switching selection window 187 on the operation screen is grayed out, and touch input to the areas other than the switching selection window 187 is disabled. Therefore, while the switching selection window 187 is displayed, an icon other than the icons included in the switching selection window 187 is not operable.

When the switching condition is satisfied, options may be presented to the user to ask the degree of satisfaction with regard to the chatbot service or ask whether the problem has been solved, and the switching selection window 187 may be displayed in accordance with the user's answer. The switching selection window 187 may be displayed when it is assumed that it is difficult to respond to the user's request with the chatbot service, for example, when the answer "somewhat dissatisfied" or "dissatisfied" or the answer "the problem was not able to be solved" or "the chatbot was not helpful" is received.

As described above, when the operation (switching operation) on the first selection icon 190 or the second selection icon 192 is received, i.e., when the operator responds in place of the chatbot, it is desirable for the operator to recognize the content (response history of the chatbot) of the interactions between the user and the chatbot up to that point so that the operator properly responds to the user's inquiry. There is a problem of a reduction in the user's convenience if it takes a long time for the operator to check the response history of the chatbot. Therefore, when the operator responds in place of the chatbot, it is desirable for the operator to recognize the response history of the chatbot in a simple and appropriate manner.

Therefore, according to the present embodiment, the operator may check the entire response history of the chatbot when the amount of information on the response history of the chatbot is equal to or less than a predetermined threshold, and the operator may check the summary of the response history based on the entire content of the response history of the chatbot when the amount of information on the response history of the chatbot is more than the threshold.

An operation example of the chatbot service according to the first embodiment is described with reference to FIGS. 11 and 12, etc. First, in the chatbot service according to the present embodiment, the storage of the server 12 accumulates data (response history data) on the response history of the chatbot each time the user and the chatbot have an interaction. The response history of the chatbot includes the content of the question from the user, the content of the answer of the chatbot to the question from the user, etc.

When the operator responds in place of the chatbot, the mobile terminal 16 transmits, to the server 12, data (history transmission instruction data) on an instruction (history transmission instruction) for transmitting the response history data on the user who has been using the chatbot to the call center terminal 80. The history transmission instruction data includes data (image processing device identification data) of identification information on the image processing device 14, which has generated the coded image 142 (has generated the activation data) and data (mobile terminal identification data) of identification information on the mobile terminal 16 itself. When the server 12 receives the history transmission instruction, the server 12 transmits, to the call center terminal 80, the response history data, the image processing device identification data, and the mobile terminal identification data in such a manner that they are associated with each other. Various types of data described above are transmitted and received between devices (terminals) via the network 18.

Figure 11:
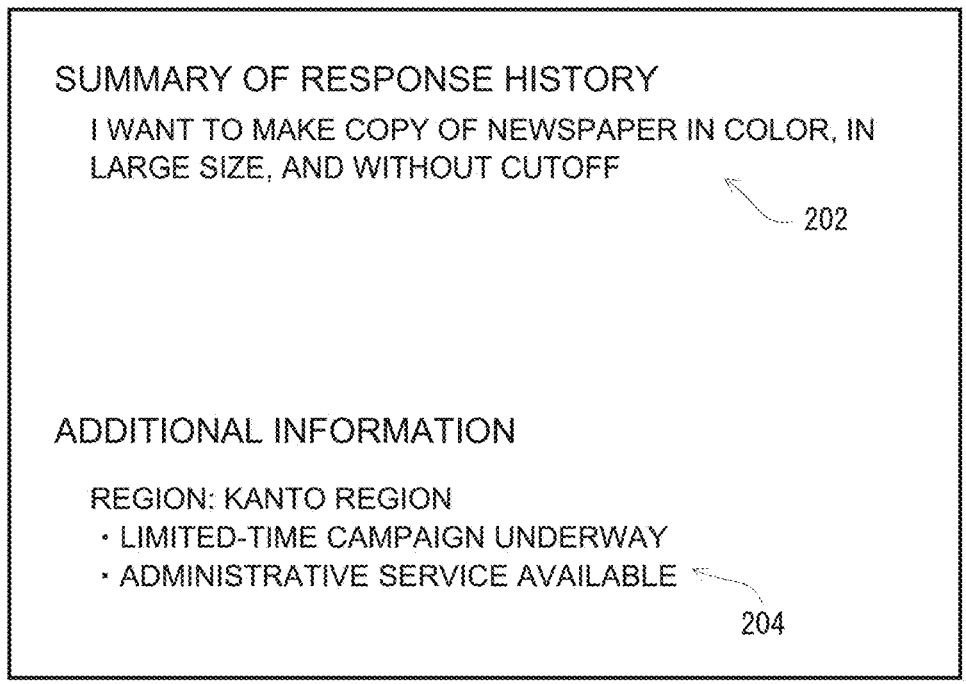
FIG. 11 is a schematic diagram illustrating an example of a check screen.
Figure 12:
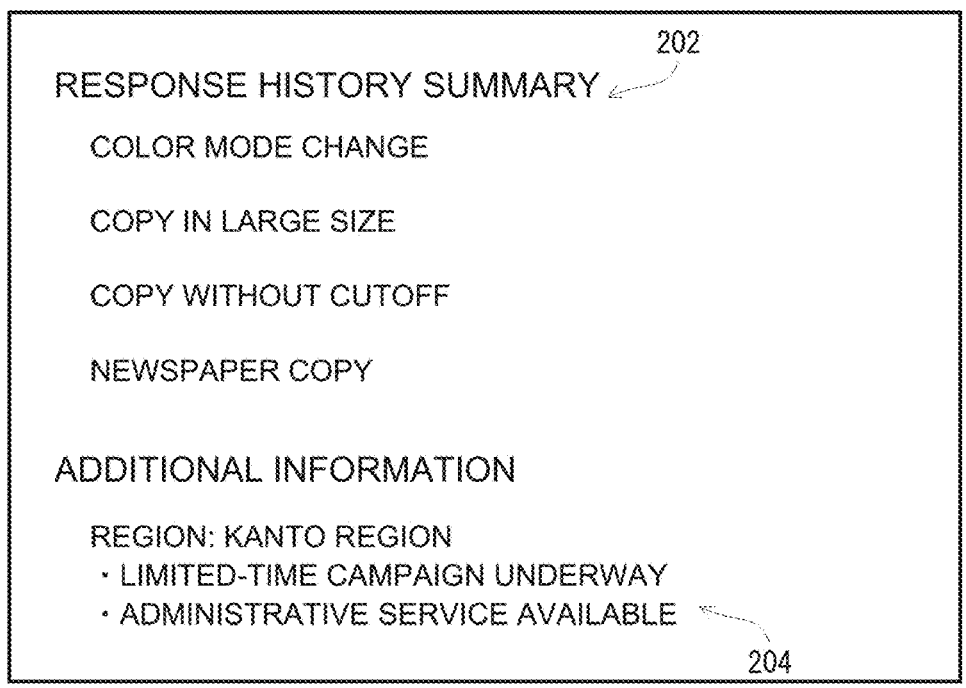
FIG. 12 is a schematic diagram illustrating another example of the check screen.

As illustrated in FIGS. 11 and 12, when the call center terminal 80 acquires (receives) support data, the display 96 of the call center terminal 80 presents a check screen 200 including the content of the response history of the chatbot.

When the amount of information on the response history of the chatbot is equal to or less than the predetermined threshold, the check screen 200 displays entire information (not illustrated) indicating the entirety (entire text or original text) of the response history of the chatbot. The amount of information on the response history of the chatbot is, for example, the number of characters, and in this case, the threshold is set to, for example, 800 to 1200 characters.

On the other hand, when the amount of information on the response history of the chatbot is more than the threshold, the check screen 200 displays summary information 202 on the response history indicating the summary of the response history based on the entire content of the response history of the chatbot. The summary of the response history includes an important part or important word (keywords) included in the original text of the response history of the chatbot and has a reduced amount of information (number of characters) compared to the original text of the response history of the chatbot.

The summary of the response history is represented as a summary text as illustrated in FIG. 11 or is represented by itemizing shortened texts as illustrated in FIG. 12.

For example, the summary of the response history is generated by executing a text shortening process, summarizing process, or the like, on the original text of the response history of the chatbot. The text shortening process is a process to delete a conjunction, adverb, or the like, included in the original text to shorten the text (reduce the number of characters) while retaining a keyword. The summarizing process is a process to, for example, separate the original text into a plurality of words, calculate the degree of importance based on the frequency of the words, and generate a summary of the document based on the degree of importance of the words. The description in Japanese Unexamined Patent Application Publication No. 2009-217802 by the present applicant may be referred to for the content of the summarizing process.

FIGS. 11 and 12 illustrate the summary of the response history of the chatbot according to the embodiment in FIG. 9. The response history of the chatbot illustrated in FIG. 9 includes, as the content of the questions from the user, "I want to change color mode for copy", "I want to make copy in large size", "I want to make copy without cutoff", "I want to make copy of newspaper", etc., and also the content of the answers from the chatbot to these questions. For example, the summary of the response history of the chatbot is presented as a summary text such as "I want to make copy of newspaper in color, in large size, and without cutoff" as illustrated in FIG. 11, or represented by itemizing shortened texts such as "color mode change", "copy in large size", "copy without cutoff", and "newspaper copy" as illustrated in FIG. 12.

The check screen 200 displays, in addition to the entire information or the summary information 202, additional information 204 about the image processing device 14 that has been operated by the user at the time of activation of the chatbot service. The additional information 204 includes information about the image processing device 14 that has been operated by the user at the time of activation of the chatbot service, e.g., information (position information) about the installation location (e.g., store information or facility information) of the image processing device 14, region information about the installation location of the image processing device 14, information about an event at the installation location or region of the image processing device 14, or information on the availability of a special service (e.g., administrative service) that may be provided by the image processing device 14. The information on the installation location of the image processing device 14 includes, for example, store information (the name of a store) and facility information (the name of a facility such as the name of a station) of the image processing device 14. The special service corresponds to, for example, an administrative service (service for issuing a copy of residence certificate and official certificate). The additional information 204 is displayed in accordance with the installation location, or the like, of the image processing device 14 indicated by the image processing device identification data.

Thus, according to the present embodiment, as the check screen 200 presented on the display 96 of the call center terminal 80 includes the information indicating the response history of the chatbot, the operator at the call center may appropriately recognize the response history of the chatbot.

The check screen 200 displays at least either the entire information indicating the entirety of the response history of the chatbot when the amount of information on the response history of the chatbot is equal to or less than the threshold or the summary information 202 indicating the summary of the response history based on the response history of the chatbot when the amount of information on the response history of the chatbot is more than the threshold; therefore, even when the amount of information on the response history of the chatbot is large, the operator at the call center may easily recognize the response history of the chatbot.

Further, as the check screen 200 displays the additional information 204 about the image processing device 14 that has been operated by the user at the time of activation of the chatbot service, the user may be appropriately supported in accordance with the status of the image processing device 14.

The above-described operation of the image processing system 10 is performed when the CPU 22 of the image processing device 14 executes an image processing device control program stored in the RAM 24, the CPU 62 of the mobile terminal 16 executes a mobile terminal control program stored in the RAM 64, the CPU 12*a* of the server 12 executes a server control program stored in the RAM 12*b*, and the CPU 82 of the call center terminal 80 executes a call center terminal control program stored in the RAM 84. The specific processing is described below using a flowchart.

Figure 13:
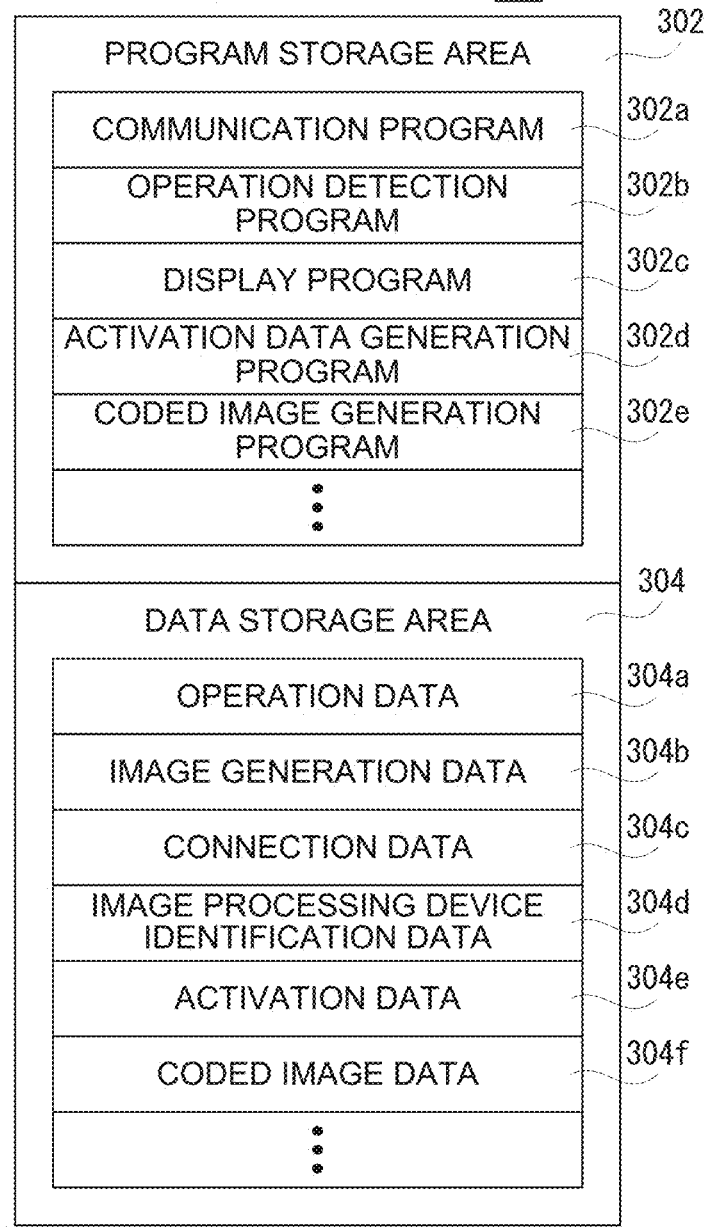
FIG. 13 is a schematic diagram illustrating an example of a memory map of a RAM of the image processing device illustrated in FIG. 2.

FIG. 13 is a schematic diagram illustrating an example of a memory map 300 of the RAM 24 of the image processing device 14 illustrated in FIG. 2. As illustrated in FIG. 13, the RAM 24 includes a program storage area 302 and a data storage area 304. The program storage area 302 of the RAM 24 stores the image processing device control program, as described above. The image processing device control program includes a communication program 302*a*, an operation detection program 302*b*, a display program 302*c*, an activation data generation program 302*d*, and a coded image generation program 302*e*.

The communication program 302*a* is a program to communicate (transmit and receive) data with an external computer such as the server 12, the mobile terminal 16, and the call center terminal 80 or other devices via the network 18. The communication program 302*a* is also a program to communicate directly with the mobile terminal 16 via a wireless communication.

The operation detection program 302*b* is a program to detect a user's operation input to an operation button and a touch panel included in the input device 52. In accordance with the operation detection program 302*b*, the CPU 22 detects operation data or an operation signal caused by the user operation on the operation button or detects touch coordinate data input by an operation on the touch panel.

The display program 302*c* is a program to generate display image data, i.e., screen data on various operation screens described above, by using the image generation data 304*b* described below and output the display image data to the display 54. The display program 302*c* is also a program to output a coded image to the display 54 in accordance with coded image data described below.

The activation data generation program 302*d* is a program to generate the activation data including the connection data, the image processing device identification data, etc., for activating the chatbot service in the mobile terminal 16, or the like.

The coded image generation program 302*e* is a program to generate a coded image having the activation data embedded therein.

Although not illustrated, the program storage area 302 also stores a code reading program to control the code reader 32 to extract a coded image from a captured image, which is captured by a laser scanner or a camera, and decode the extracted coded image, a paper sheet printing program to control the paper sheet printer 34 to print a character string, image, bar code, and the like, on a roll of paper, a photo printing program to control the photoprinter 36 to print an image on photo paper, a short-range communication program to control the short-range communicator 38 to perform data communication with a communication target (e.g., identification card, membership card, or electronic money medium), an image reading program to control the image reader 40 to read an image of an original and output an image signal (transmission image) corresponding to the read image, an image forming program to control the image former 42 to print a multicolor or monochromatic print image on paper in accordance with print data, a storage medium connection program to control writing of data to various recording media attached to the storage medium connector 44 and reading of data from various recording media, a program to set a fee for a service or the like in the image processing device 14, a program to control the money processor 46 to calculate an amount of input money, return a coin through the coin return slot 46*b* in accordance with the remaining amount of money obtained by subtracting the fee for a predetermined service, or the like, from the amount of input money, and return a bill through the bill input slot, a program to select and execute various functions provided by the image processing device 14, etc.

The data storage area 304 of the RAM 24 stores operation data 304*a*, image generation data 304*b*, connection data 304*c*, image processing device identification data 304*d*, activation data 304*e*, coded image data 304*f*, etc.

The operation data 304*a* is operation input data including operation data and/or touch coordinate data detected in accordance with the operation detection program 302*b*. The image generation data 304*b* is data such as polygon data or texture data for generating display image data corresponding to various screens to be presented on the display 54.

The connection data 304*c* is data for accessing the server that provides the chatbot service. The image processing device identification data 304*d* is data of information for identifying the image processing device 14 by other devices or terminals.

The activation data 304*e* is data generated in accordance with the activation data generation program 302*d* to activate the chatbot service in the mobile terminal 16, etc. The activation data 304*e* includes, for example, the connection data 304*c*, or the image processing device identification data 304*d*.

The coded image data 304*f* is data on the coded image generated in accordance with the coded image generation program 302*e* and having the activation data embedded therein.

Although not illustrated, the data storage area 304 stores other types of data needed to execute the image processing device control program and includes a timer (counter) or register needed to execute the image processing device control program.

Figure 14:
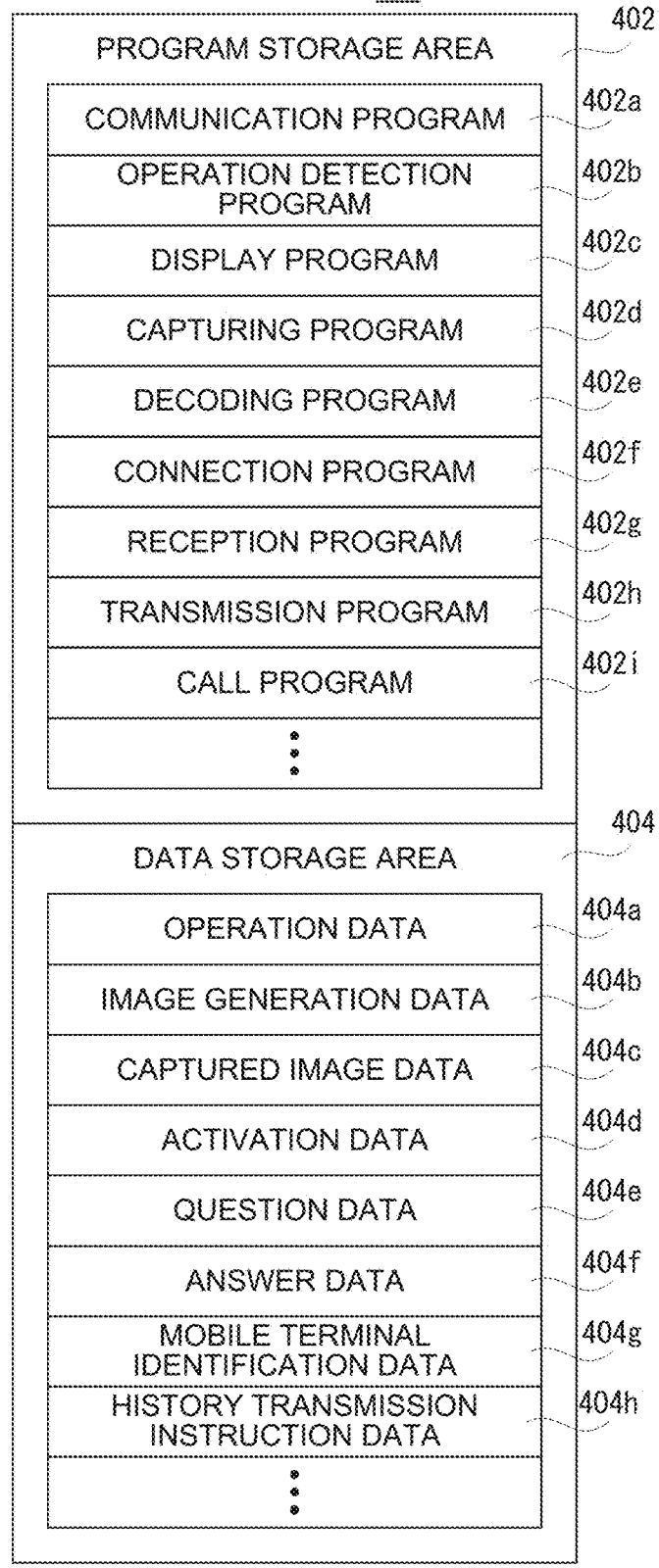
FIG. 14 is a schematic diagram illustrating an example of a memory map of a RAM of the mobile terminal illustrated in FIG. 3.

FIG. 14 is a schematic diagram illustrating an example of a memory map 400 of the RAM 64 of the mobile terminal 16 illustrated in FIG. 3. As illustrated in FIG. 14, the RAM 64 includes a program storage area 402 and a data storage area 404. The program storage area 402 of the RAM 64 stores a mobile terminal control program, as described above. The mobile terminal control program includes a communication program 402*a*, an operation detection program 402*b*, a display program 402*c*, a capturing program 402*d*, a decoding program 402*e*, a connection program 402*f*, a reception program 402*g*, a transmission program 402*h*, and a call program 402*i*.

The communication program 402a is a program to communicate data with an external computer such as the server 12, the image processing device 14, and the call center terminal 80 or other devices via the network 18. The communication program 402a is also a program to directly communicate with the image processing device 14 via a wireless communication. The communication program 402a is also a program to wirelessly communicate with a mobile base station.

The operation detection program 402b is a program to detect a user's operation input to the touch panel 76. The display program 402c is a program to generate screen data on various operation screens using the image generation data 404b described below and output the screen data to the display 78.

The capturing program 402d is a program to control the camera 72 and generate a captured image. The decoding program 402e is a program to extract a coded image from a captured image and decode the extracted coded image.

The connection program 402f is a program to connect (access) the server 12 having the chatbot function in accordance with the activation data (connection data) obtained by decoding the coded image.

The reception program 402g is a program to receive answer data transmitted from the server 12. To receive data, communication processing is executed in accordance with the communication program 402a.

The transmission program 402h is a program to transmit, to the server 12, data (question data) on the question input by the user in the chatbot service. The transmission program 402h is also a program to transmit history transmission instruction data 404h described below to the server 12. To transmit data, communication processing is executed in accordance with the communication program 402a.

The call program 402i is a program to perform voice call processing. To execute the voice call processing, communication processing is executed in accordance with the communication program 402a.

Although not illustrated, the program storage area 402 also stores a program, or the like, to select and execute various functions provided by the mobile terminal 16.

The data storage area 404 of the RAM 84 stores operation data 404a, the image generation data 404b, captured image data 404c, activation data 404d, question data 404e, answer data 404f, mobile terminal identification data 404g, the history transmission instruction data 404h, etc.

The operation data 404a is operation input data including touch coordinate data detected in accordance with the operation detection program 402b. The image generation data 404b is data such as polygon data or texture data for generating display image data corresponding to various screens presented on the display 78.

The captured image data 404c is data on a captured image that is captured by the camera 72 in accordance with the capturing program 402d.

The activation data 404d includes the connection data obtained by decoding the coded image to access the server providing the chatbot service and the image processing device identification data for identifying the image processing device 14 that has generated the activation data.

The question data 404e is data on the question input by the user in the chatbot service. The answer data 404f is data on the answer to the question, which is transmitted from the server 12.

The mobile terminal identification data 404g is data of the identification information on the mobile terminal 16 itself.

The history transmission instruction data 404h is data on the history transmission instruction indicating that, when the operation for responding by the operator in place of the chatbot is received, the data on the response history of the chatbot is transmitted to the call center terminal 80. The history transmission instruction data 404h includes the image processing device identification data included in the activation data and the mobile terminal identification data 404g.

Although not illustrated, the data storage area 404 stores other types of data needed to execute the mobile terminal control program and includes a timer (counter) or register needed to execute the mobile terminal control program.

Figure 15:
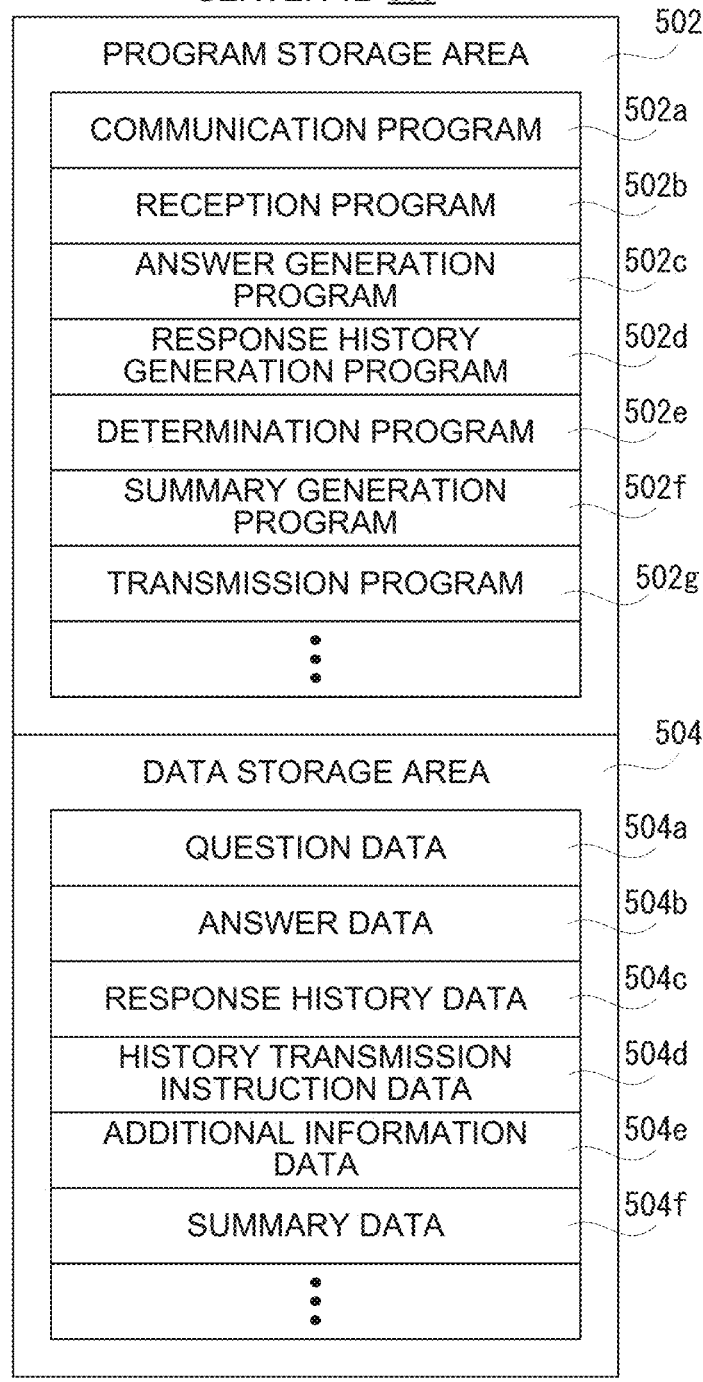
FIG. 15 is a schematic diagram illustrating an example of a memory map of a RAM of a server illustrated in FIG. 1.

FIG. 15 is a schematic diagram illustrating an example of a memory map 500 of the RAM 12b of the server 12 illustrated in FIG. 1. As illustrated in FIG. 15, the RAM 12b includes a program storage area 502 and a data storage area 504. The program storage area 502 of the RAM 12b stores the server control program, as described above. The server control program includes a communication program 502a, a reception program 502b, an answer generation program 502c, a response history generation program 502d, a determination program 502e, a summary generation program 502f, and a transmission program 502g.

The communication program 502a is a program to communicate data with an external computer such as the image processing device 14, the mobile terminal 16, and the call center terminal 80 or other devices via the network 18.

The reception program 502b is a program to receive question data, or the like, transmitted from the mobile terminal 16. The reception program 502b is also a program to receive the history transmission instruction data transmitted from the mobile terminal 16. Tb receive data, communication processing is executed in accordance with the communication program 502a.

The answer generation program 502c is a program to automatically generate an answer to the question indicated by the question data.

The response history generation program 502d is a program to generate or update the response history data when the question data is received and when the answer is generated (transmitted). The response history generation program 502d is also a program to extract the current response history data when the history transmission instruction data is received and the history transmission instruction is accepted.

The determination program 502e is a program to determine whether the amount of information on the response history indicated by the response history data extracted when the history transmission instruction is received is more than the threshold.

The summary generation program 502f is a program to generate data (summary data) on the summary of the response history based on the entire content of the response history by the method described above, or the like, when it is determined that the amount of information on the response history is more than the threshold.

The transmission program 502g is a program to transmit, to the mobile terminal 16, data (answer data) on the answer generated in accordance with the answer generation program 502c. The transmission program 502g is a program to transmit, to the call center terminal 80, the response history data, which is associated with the mobile terminal identification data and the image processing device identification data related to the history transmission instruction, when the history transmission instruction is received. The summary data is further associated with the response history data and transmitted to the call center terminal 80 when there is the summary data corresponding to the response history data, and the additional information data is further associated with the response history data and transmitted to the call center terminal 80 when there is the additional information data corresponding to the response history data. To transmit data, communication processing is executed in accordance with the communication program 502a.

Although not illustrated, the program storage area 502 also stores a program, or the like, to select and execute various functions provided by the server 12.

The data storage area 504 of the RAM 12b stores question data 504a, answer data 504b, response history data 504c, history transmission instruction data 504d, additional information data 504e, summary data 504f, etc.

The question data 504a is data on the question input by the user in the chatbot service and is transmitted from the mobile terminal 16. The answer data 504b is data on the answer to the question indicated by the received question data and is generated in accordance with the answer generation program 502c.

The response history data 504c is the data of the entire response history of the chatbot. The history transmission instruction data 504d is data on the history transmission instruction transmitted from the mobile terminal 16. The additional information data 504e is data of additional information for each of the image processing devices 14 included in the image processing system 10. The summary data 504f is data on the summary of the response history based on the content of the entire response history of the chatbot.

Although not illustrated, the data storage area 504 stores other types of data needed to execute the server control program and includes a timer (counter) or register needed to execute the server control program.

Figure 16:
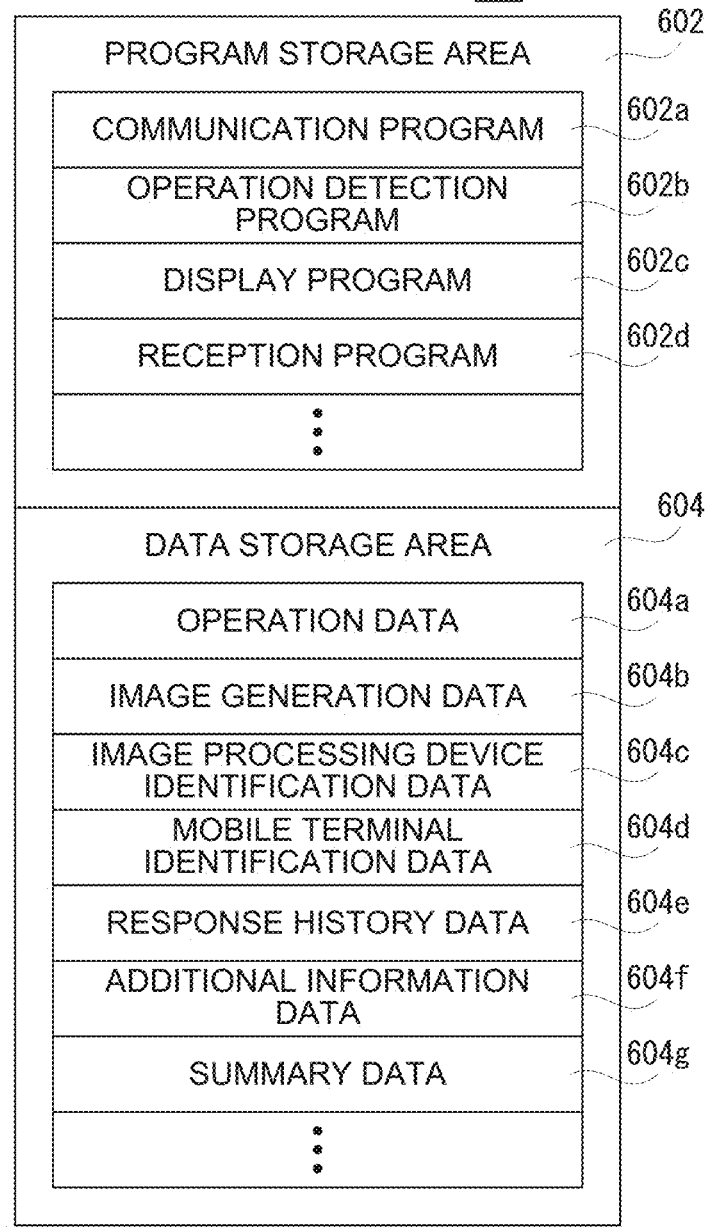
FIG. 16 is a schematic diagram illustrating an example of a memory map of a RAM of the call center terminal illustrated in FIG. 4.

FIG. 16 is a schematic diagram illustrating an example of a memory map 600 of the RAM 84 of the call center terminal 80 illustrated in FIG. 4. As illustrated in FIG. 16, the RAM 84 includes a program storage area 602 and a data storage area 604. The program storage area 602 of the RAM 84 stores a call center terminal control program, as described above. The call center terminal control program includes a communication program 602a, an operation detection program 602b, a display program 602c, and a reception program 602d.

The communication program 602a is a program to communicate data with an external computer such as the server 12, the image processing device 14, and the mobile terminal 16 or other devices via the network 18.

The operation detection program 602b detects operation data or an operation signal or detects touch coordinate data in response to a user's operation input to the operation button and the touch panel included in the input device 94.

The display program 602c is a program to generate screen data on various operation screens including the check screen 200 using image generation data 604b described below and output the screen data to the display 96. The display program 602c is also a program (presentation program) to display the check screen 200 on the display 96 to present the summary of the response history to the operator.

The reception program 602d is a program to receive the response history data that is transmitted from the server 12 and is associated with the image processing device identification data, the mobile terminal identification data, the additional information data, the summary data, etc. To receive data, communication processing is executed in accordance with the communication program 502a.

Although not illustrated, the program storage area 602 also stores programs, or the like, for selecting and executing various functions provided by the call center terminal 80.

The data storage area 604 of the RAM 84 stores operation data 604a, the image generation data 604b, image processing device identification data 604c, mobile terminal identification data 604d, response history data 604e, additional information data 604f, summary data 604g, etc.

The operation data 604a is operation input data including operation data and/or touch coordinate data detected in accordance with the operation detection program 602b. The image generation data 604b is data such as polygon data or texture data for generating display image data corresponding to various screens to be presented on the display 96.

The image processing device identification data 604c, the mobile terminal identification data 604d, the response history data 604e, the additional information data 604f, and the summary data 604g are data transmitted from the server 12.

Although not illustrated, the data storage area 504 stores other types of data needed to execute the server control program and includes a timer (counter) or register needed to execute the server control program.

Figure 17:
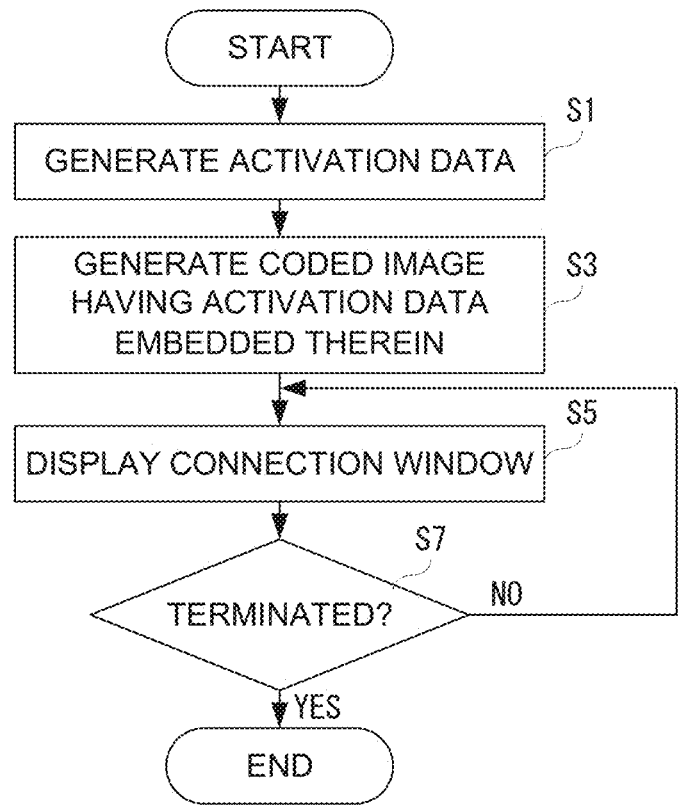
FIG. 17 is a flowchart illustrating an example of information processing of a CPU of the image processing device illustrated in FIG. 2.

FIG. 17 is a flowchart illustrating an example of information processing executed by the CPU 22 of the image processing device 14 (information processing of the image processing device 14) illustrated in FIG. 2. This information processing is started when the activation operation is received or when the activation condition for the chatbot service is satisfied.

As illustrated in FIG. 17, when the CPU 22 of the image processing device 14 starts the information processing, the activation data including the connection data and the image processing device identification data is generated at Step S1, the coded image having the activation data embedded therein is generated at Step S3, the connection window 138 including the coded image is displayed at Step S5, and it is determined whether the information processing is to be terminated at Step S7. For example, at Step S7, it is determined whether a predetermined time period has elapsed from the time when the connection window 138 is displayed.

When it is "NO" at Step S7, that is, when it is determined that the information processing is not to be terminated, the process returns to Step S5. Conversely, when it is "YES" at Step S7, the information processing is terminated.

Figure 18:
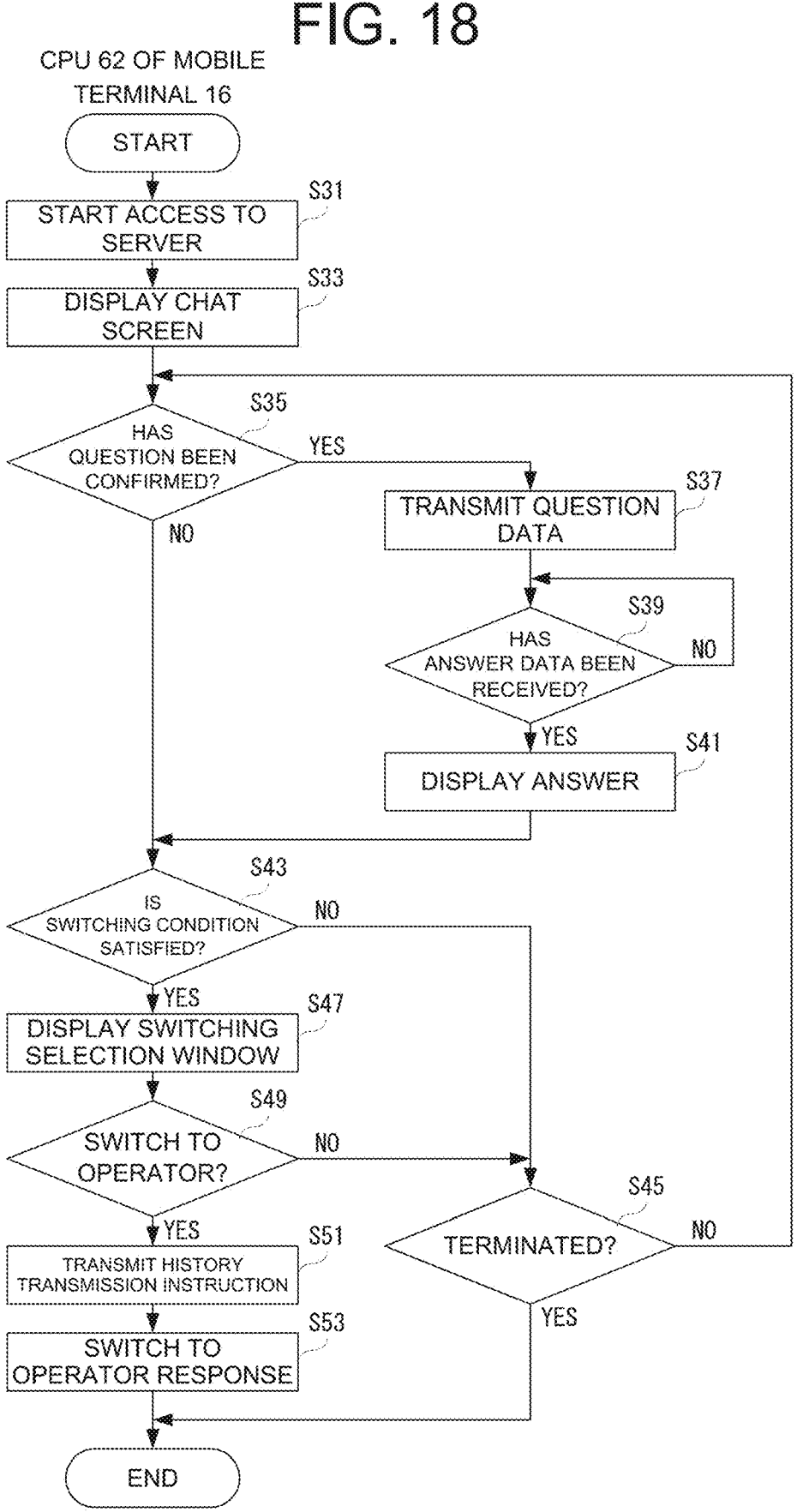
FIG. 18 is a flowchart illustrating an example of information processing of a CPU of the mobile terminal illustrated in FIG. 3.

FIG. 18 is a flowchart illustrating an example of information processing of the CPU 62 of the mobile terminal 16 (information processing of the mobile terminal 16). This information processing is started when the activation data is acquired. As illustrated in FIG. 18, when the CPU 62 of the mobile terminal 16 starts the information processing, an access to the server 12, which provides the chatbot service, is started in accordance with the connection data included in the activation data at Step S31, the data on the operation screen for the chatbot service is acquired from the server 12 and the operation screen (chat screen) of the chatbot service is presented on the display 78 at Step S33, and it is determined whether the question has been confirmed at Step S35. Here, it is determined whether a question has been input in the question input field 184 and an operation for confirming the question has been received.

When it is "NO" at Step S35, that is, when it is determined that the question has not been confirmed, the process proceeds to Step S43 described below. Conversely, when it is "YES" at Step S35, that is, when it is determined that the question has been confirmed, the data (question data) indicating the question is transmitted to the server 12 at Step S37, and it is determined whether the answer data has been received at Step S39.

When it is "NO" at Step S39, that is, when it is determined that no answer data has been received, the process returns to Step S39. Conversely, when it is "YES" at Step S39, that is, when it is determined that the answer data has been received, the content of the answer indicated by the answer data is presented on the display 78 at Step S41, and the process proceeds to Step S43.

Then, at Step S43, it is determined whether the switching condition for switching to the operator response is satisfied. When it is "NO" at Step S43, that is, when it is determined that the switching condition is not satisfied, it is determined whether the chatbot service is to be terminated at Step S45.

When it is "NO" at Step S45, that is, when it is determined that the chatbot service is not to be terminated (the chatbot service is to be continued), the process returns to Step S35. Conversely, when it is "YES" at Step S45, that is, when it is determined that the chatbot service is to be terminated, the access to the server 12 providing the chatbot service is terminated and the information processing is terminated.

Conversely, when it is "YES" at Step S43, that is, when it is determined that the switching condition is satisfied, the switching selection window is presented on the display 78 at Step S47, and it is determined whether to switch to the operator response at Step S49. When it is "NO" at Step S49, that is, when it is determined that switching to the operator response is not to be executed, the process proceeds to Step S45.

Conversely, when it is "YES" at Step S49, that is, when it is determined that switching to the operator response is to be executed, the data (history transmission instruction data) on the history transmission instruction is transmitted to the server 12 at Step S51, and switching to the operator response (voice call or chat with the operator) is executed at Step S53, and the information processing is terminated.

Figure 19:
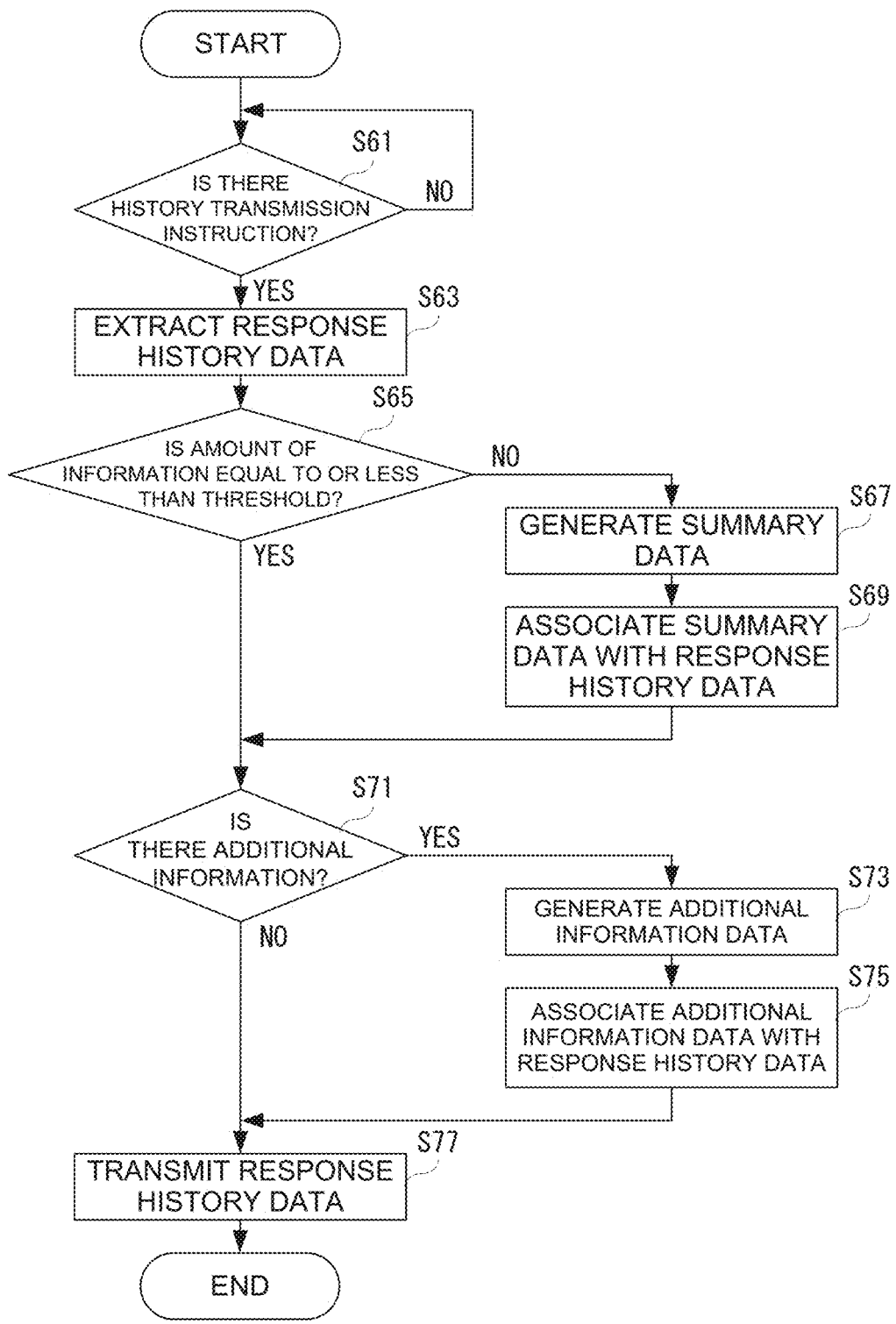
FIG. 19 is a flowchart illustrating an example of information processing of a CPU of the server illustrated in FIG. 1.

FIG. 19 is a flowchart illustrating an example of information processing of the CPU 12a of the server 12 (information processing of the server 12). As illustrated in FIG. 19, when the CPU 12a of the server 12 starts information processing, it is determined whether the history transmission instruction has been received (whether the history transmission instruction data has been received) at Step S61.

When it is "NO" at Step S61, that is, when it is determined that no history transmission instruction has been received, the process returns to Step S61. Conversely, when it is "YES" at Step S61, that is, when it is determined that the history transmission instruction has been received, the response history data up to that point is extracted at Step S63, and it is determined whether the amount of information on the response history is equal to or less than the predetermined threshold at Step S65.

When it is "YES" at Step S65, that is, when the amount of information on the response history is equal to or less than the threshold, the process proceeds to Step S71 described below. Conversely, when it is "NO" at Step S65, that is, when the amount of information on the response history is not equal to or less than the threshold (the amount of information on the response history is more than the threshold), data (summary data) on the summary of the response history based on the response history of the chatbot is generated at Step S67, and the summary data is associated with the data on the response history at Step S69, and the process proceeds to Step S71.

Subsequently, at Step S71, it is determined whether there is additional information about the image processing device 14 that has been operated by the user at the time of activation of the service. When it is "NO" at Step S71, that is, when it is determined that there is no additional information, the process proceeds to Step S77 described below. Conversely, when it is "YES" at Step S71, that is, when it is determined that there is additional information, data (additional information data) of the additional information is generated at Step S73, the additional information data is associated with the data on the response history at Step S75, and the process proceeds to Step S77.

Subsequently, at Step S77, the response history data is transmitted to the call center terminal 80, and the information processing is terminated. At Step S77, when the response history data is associated with the summary data and/or the data of the additional information, those data are also transmitted to the call center terminal 80 together with the response history data.

Figure 20:
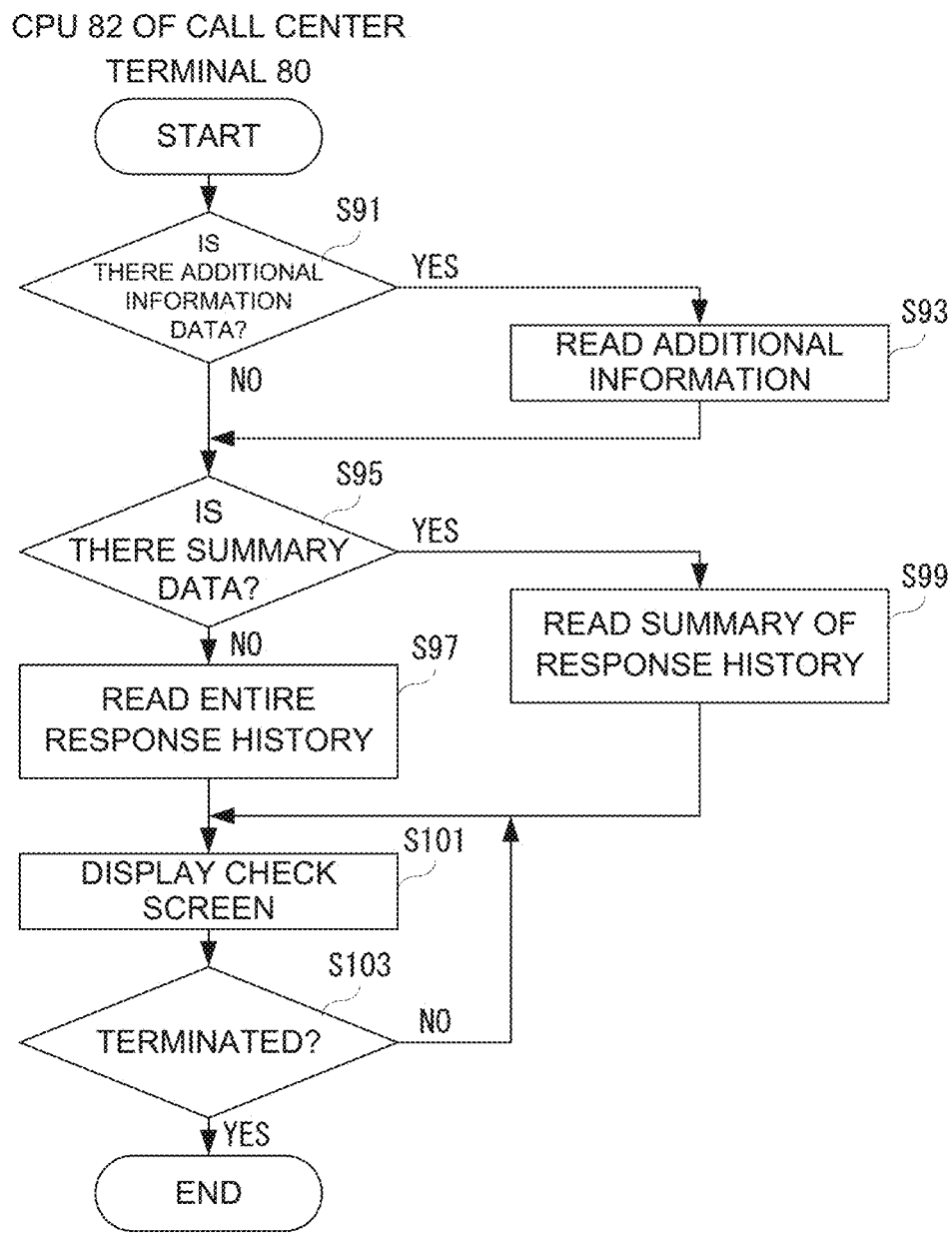
FIG. 20 is a flowchart illustrating an example of information processing of a CPU of the call center terminal illustrated in FIG. 4.

FIG. 20 is a flowchart illustrating an example of information processing of the CPU 82 of the call center terminal 80 (information processing of the call center terminal 80). This information processing is started when the data on the response history is acquired (received).

As illustrated in FIG. 20, when the CPU 82 of the call center terminal 80 starts information processing, it is determined whether there is additional information data associated with the response history data at Step S91. When it is "NO" at Step S91, that is, when it is determined that there is no additional information data, the process proceeds to Step S95 described below. Conversely, when it is "YES" at Step S91, that is, when it is determined that there is additional information data, the additional information indicated by the additional information data is read at Step S93, and the process proceeds to Step S95.

Subsequently, at Step S95, it is determined whether there is summary data associated with the response history data. When it is "NO" at Step S95, that is, when it is determined that there is no summary data, the entire response history indicated by the response history data is read at Step S97, and the process proceeds to Step S101 described below. Conversely, when it is "YES" at Step S95, that is, when it is determined that there is summary data, the summary of the response history indicated by the summary data is read at Step S99, and the process proceeds to Step S101.

Subsequently, at Step S101, the check screen is displayed, and it is determined whether the display of the check screen is to be terminated at Step S103. When it is "NO" at Step S103, the process returns to Step S101. Conversely, when it is "YES" at Step S103, the information processing is terminated.

According to the first embodiment, the operator at the call center may easily recognize the response history of the chatbot even when the amount of information on the response history of the chatbot is large.

Second Embodiment

The image processing system 10 according to a second embodiment is the same as that in the first embodiment except that, when the summary of the response history based on the response history of the chatbot is displayed, the original text of the response history corresponding to the summary of the response history may be displayed in response to the operator's operation, and therefore the content different from the first embodiment is described and duplicated descriptions are omitted.

Figure 21:
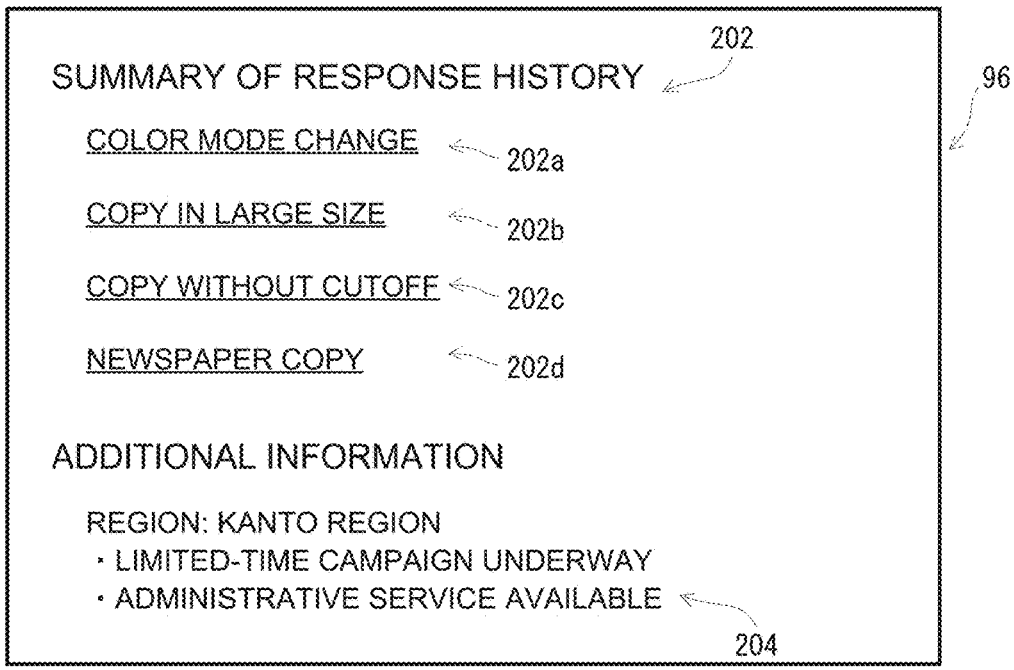
FIG. 21 is a schematic diagram illustrating an example of the check screen according to a second embodiment.
Figure 22:
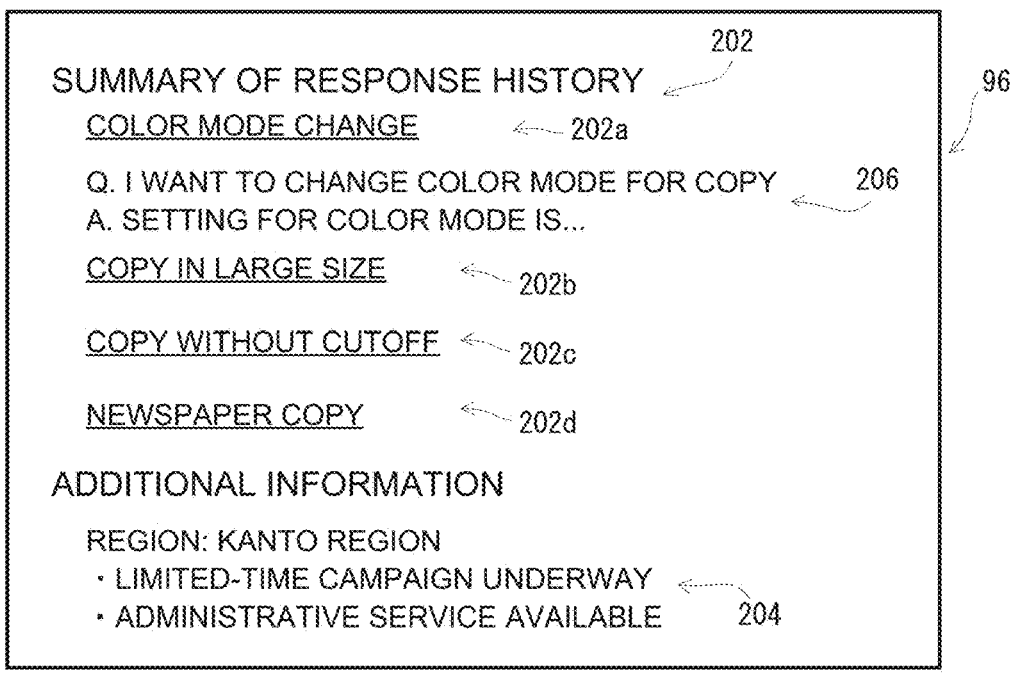
FIG. 22 is a schematic diagram illustrating another example of the check screen according to the second embodiment.

FIGS. 21 and 22 are schematic diagrams illustrating an example of the check screen 200 according to the second embodiment. As illustrated in FIGS. 21 and 22, according to the second embodiment, all or some of the summary information 202 on the response history are operation icons (display switch icons). For example, display portions of the summary texts included in the summary information 202 are display switch icons 202a to 202d.

The portion functioning as the display switch icon in the summary information 202 is highlighted by, for example, being given with a pattern, an appropriate color, or an underline or being displayed in boldface.

In the case described in the examples illustrated in FIGS. 21 and 22, the entire summary text included in the summary information 202 is set as the display switch icons 202a to 202d, but a part of the summary text included in the summary information 202, e.g., only a keyword part, may be set as a display switch icon.

When an operation (detail display operation) on the display switch icon 202a is received, an original text (detailed content) 206 of the portion corresponding to the selected display switch icon 202a is displayed, as illustrated in FIG. 22. That is, the original text of the summary text or itemized text corresponding to the selected summary information 202 before a text shortening process, summarizing process, or the like, is displayed.

Information processing of the call center terminal 80 according to the second embodiment is described below using a flowchart, in which the same processing as the information processing of the call center terminal 80 described in the first embodiment is denoted by the same reference numeral, and a description is omitted or a brief description is given for duplicated content.

Figure 23:
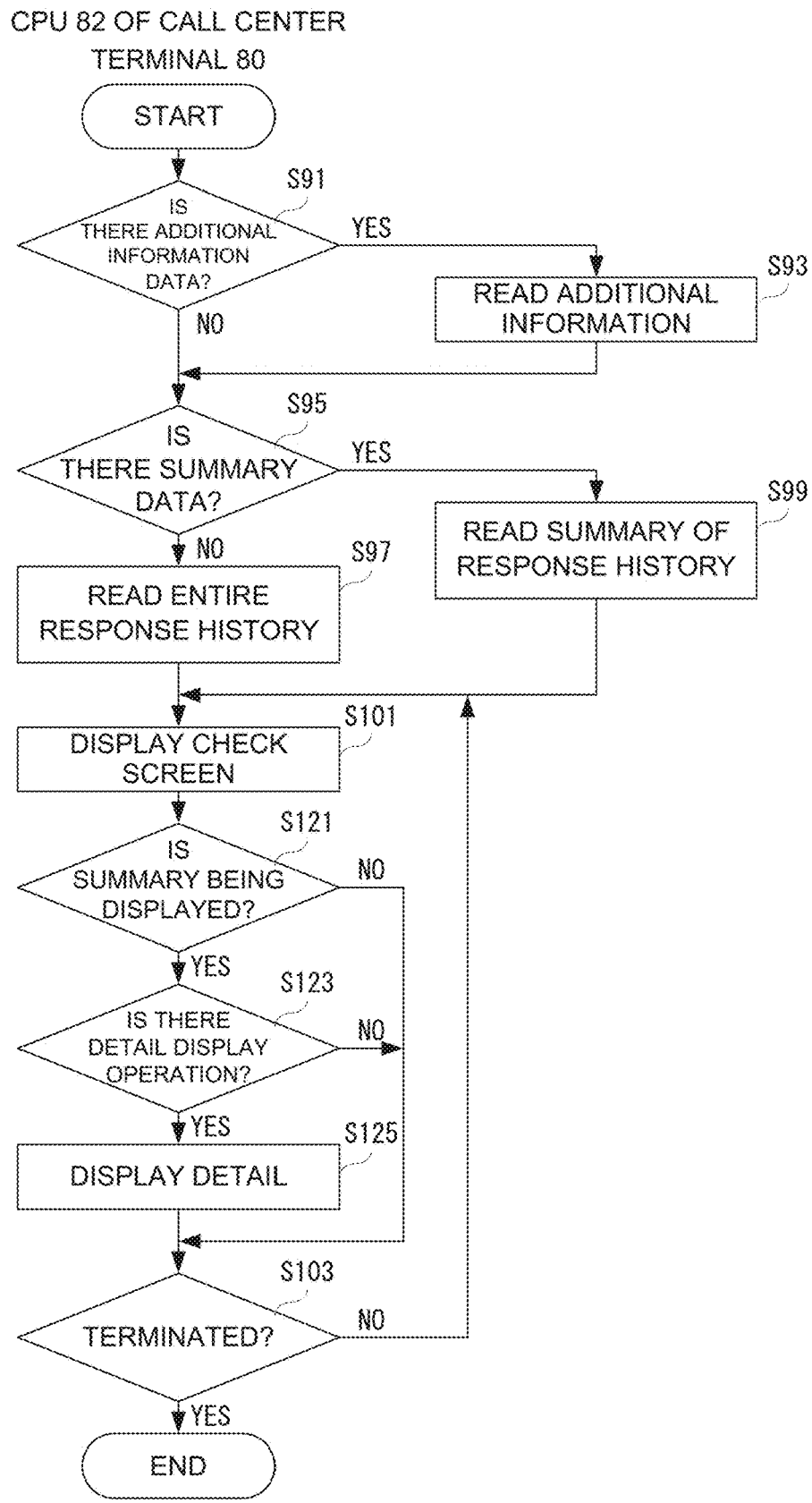
FIG. 23 is a flowchart illustrating an example of information processing of the call center terminal according to the second embodiment.

FIG. 23 is a flowchart illustrating an example of the information processing of the call center terminal 80 according to the second embodiment. As illustrated in FIG. 23, when the CPU 82 of the call center terminal 80 starts the information processing, the check screen is displayed at Step S101, and it is determined whether the summary of the response history is being displayed at Step S121. When it is "NO" at Step S121, the process proceeds to Step S103. Conversely, when it is "YES" at Step S121, it is determined whether there is a detail display operation at Step S123. When it is "NO" at Step S123, the process proceeds to Step S103. Conversely, when it is "YES" at Step S123, the detailed content of the portion corresponding to the selected display switch icon is displayed at Step S125, and the process proceeds to Step S103.

As the content of the processing up to Step S103 is the same as that in the first embodiment, detailed descriptions are omitted. As the information processing of the image processing device 14, the information processing of the mobile terminal 16, and the information processing of the server 12 are the same as those in the first embodiment, descriptions are omitted.

According to the second embodiment, even when the summary of the response history is displayed, the operator may switch the amount of information presented as needed, and the operator may recognize the response history of the chatbot in a simple and appropriate manner.

In the above-described embodiment, when an operation (switching operation) is performed on the first selection icon 190 or the second selection icon 192, the operator responds in place of the chatbot; however, in some circumstances of the call center, it may take several minutes to several dozen minutes from when the switching operation is performed to when the operator response starts. In such a case, the response history of the chatbot is temporarily stored in at least either the server 12 or the call center terminal 80, inquiry identification information for identifying the mobile terminal 16 (or the user using it) and the response history of the chatbot associated with the mobile terminal 16 is issued, and the issued inquiry identification information is stored in each of the mobile terminal 16 and the call center terminal 80. Thus, when the operator response is started, the response history of the chatbot may be retrieved from the inquiry identification information.

The specific configurations, and the like, described in the above embodiments are examples and may be changed as appropriate depending on the actual product. Furthermore, the processing order of the steps in the flowcharts described in the above embodiments may be changed as appropriate as long as the same result is obtained.

What is claimed is:

1. An image processing system comprising:
   an information processing device having a chatbot function to receive a question about an image processing device providing a predetermined service to a user and automatically generate an answer; and
   a call center terminal operated by an operator at a call center, wherein
   the information processing device includes:
      a response history generator that, when a predetermined switching operation is received to switch from a response by the chatbot function to a response by the operator, generates a response history of a chatbot including content of the question and content of the answer up to when the switching operation is received;
      a determiner that determines whether an amount of information on the response history is more than a predetermined threshold;
      a summary generator that generates a summary of the response history based on the response history when the amount of information on the response history is more than the predetermined threshold; and
      a transmitter that transmits data on the summary of the response history to the call center terminal, and
   the call center terminal includes:
      an acquirer that acquires the data on the summary of the response history; and
      a presenter that presents the summary of the response history to the operator.

2. The image processing system according to claim 1, wherein the summary generator generates the summary of the response history from the response history by a summarizing process or a text shortening process.

3. The image processing system according to claim 1, wherein the transmitter transmits, to the call center terminal, the data on the response history associated with the data on the summary of the response history.

4. The image processing system according to claim 1, wherein
   the information processing device further includes an additional information acquirer that acquires additional information about the image processing device, and
   the transmitter transmits, to the call center terminal, the data on the summary of the response history associated with data on the additional information.

5. The image processing system according to claim 4, further comprising a storage that stores the additional information corresponding to position information on the image processing device, wherein
   the information processing device further includes a position information acquirer that acquires the position information on the image processing device, and the additional information acquirer acquires the additional information in accordance with the position information on the image processing device.

6. An image processing system comprising:

an information processing device having an automatic response function to receive a question about an image processing device providing a predetermined service to a user and automatically generate an answer; and a call center terminal operated by an operator at a call center, wherein the information processing device includes:
- a response history generator that, when a predetermined switching operation is received to switch from a response by the automatic response function to a response by the operator, generates a response history including content of the question and content of the answer up to when the switching operation is received;
- a determiner that determines whether an amount of information on the response history is more than a predetermined threshold;
- a summary generator that generates a summary of the response history based on the response history when the amount of information on the response history is more than the predetermined threshold; and
- a transmitter that transmits data on the summary of the response history to the call center terminal, and the call center terminal includes:
- an acquirer that acquires the data on the summary of the response history; and
- a presenter that presents the summary of the response history to the operator.

* * * * *